United States Patent
Kubozono et al.

(10) Patent No.: US 8,993,504 B2
(45) Date of Patent: Mar. 31, 2015

(54) OXIDATION CATALYST FOR BLEACHING, AND BLEACHING COMPOSITION USING THE SAME

(75) Inventors: Takayasu Kubozono, Sumida-ku (JP); Tomonari Suekuni, Sumida-ku (JP); Yosuke Kono, Sumida-ku (JP); Yukiko Iwasa, Sumida-ku (JP); Hideyuki Kaneda, Sumida-ku (JP); Yukihiro Dannoue, Sumida-ku (JP); Hiroaki Hara, Sumida-ku (JP); Yasushi Hirata, Sumida-ku (JP)

(73) Assignee: LION Corporation (JP)

( * ) Notice: Subject to any disclaimer, the term of this patent is extended or adjusted under 35 U.S.C. 154(b) by 154 days.

(21) Appl. No.: 12/808,989

(22) PCT Filed: Dec. 18, 2008

(86) PCT No.: PCT/JP2008/073054
§ 371 (c)(1),
(2), (4) Date: Jun. 17, 2010

(87) PCT Pub. No.: WO2009/078459
PCT Pub. Date: Jun. 25, 2009

(65) Prior Publication Data
US 2010/0267602 A1    Oct. 21, 2010

(30) Foreign Application Priority Data
Dec. 19, 2007 (JP) .................................. 2007-327957

(51) Int. Cl.
| | | |
|---|---|---|
| C11D 1/722 | (2006.01) | |
| C11D 3/26 | (2006.01) | |
| C11D 3/395 | (2006.01) | |
| C11D 3/33 | (2006.01) | |
| D06L 3/02 | (2006.01) | |
| B01J 27/24 | (2006.01) | |
| C11D 3/39 | (2006.01) | |
| C11D 3/20 | (2006.01) | |
| C11D 3/04 | (2006.01) | |
| B01J 23/72 | (2006.01) | |
| C11D 1/00 | (2006.01) | |
| C11D 1/72 | (2006.01) | |
| D06M 16/00 | (2006.01) | |

(52) U.S. Cl.
CPC ............... *D06L 3/021* (2013.01); *B01J 27/24* (2013.01); *C11D 1/722* (2013.01); *C11D 3/3905* (2013.01); *C11D 3/2082* (2013.01); *C11D 3/391* (2013.01); *C11D 3/042* (2013.01); *C11D 3/33* (2013.01); *C11D 3/2086* (2013.01); *B01J 23/72* (2013.01); *C11D 1/008* (2013.01); *C11D 1/72* (2013.01); *C11D 3/3932* (2013.01); *D06M 16/00* (2013.01)
USPC ........... 510/311; 510/312; 510/336; 510/356; 510/357; 510/361; 510/376; 510/477; 510/488; 510/499; 510/500

(58) Field of Classification Search
CPC ...... C11D 1/722; C11D 3/2082; C11D 3/042; C11D 3/2086; C11D 3/33; C11D 3/3905; C11D 3/391; C11D 3/3932; B01J 27/24; B01J 23/72
USPC ......... 510/302, 311, 312, 336, 356, 357, 361, 510/372, 376, 477, 488, 499, 500; 502/200, 502/324, 325
See application file for complete search history.

(56) References Cited

U.S. PATENT DOCUMENTS

| | | |
|---|---|---|
| 3,532,634 A | 10/1970 | Woods |
| 3,583,924 A | 6/1971 | Demangeon |
| 4,526,698 A | 7/1985 | Kuroda et al. |
| 4,728,455 A | 3/1988 | Rerek |
| 5,021,187 A | 6/1991 | Harriott et al. |
| 5,076,960 A | 12/1991 | Hutchings et al. |
| 5,114,606 A | 5/1992 | van Vliet et al. |
| 5,244,594 A | 9/1993 | Favre et al. |
| 5,314,635 A | 5/1994 | Hage et al. |
| 5,356,554 A | 10/1994 | Delwel et al. |

(Continued)

FOREIGN PATENT DOCUMENTS

| | | |
|---|---|---|
| EP | 0 544 490 A1 | 6/1993 |
| EP | 1621605 * | 2/2006 |

(Continued)

OTHER PUBLICATIONS

English Language Machine Translation of JP2008-104920.*

(Continued)

*Primary Examiner* — Gregory R Delcotto
(74) *Attorney, Agent, or Firm* — Merchant & Gould P.C.

(57) ABSTRACT

The present invention provides an oxidation catalyst for bleaching containing a component (a) which is an anion caused from a chelating agent having less than or equal to coordination position 5 and/or the chelating agent, and a component (b) which is a copper and/or manganese compound; and a binder compound (c); a hydrogen peroxide-based compound (d) which dissolves in water and generates hydrogen peroxide, the bleaching composition containing a granulated product or a molded product in which at least the component (b) and the component (c) are granulated or molded together. According to the invention, an oxidation catalyst that promotes the oxidation effect of hydrogen peroxide-based compounds with a trace amount of the composition, and has excellent effects of suppressing the decomposition of hydrogen peroxide-based compounds and suppressing coloration of the catalyst itself, and a bleaching composition containing the oxidation catalyst can be utilized.

14 Claims, No Drawings

(56) References Cited

U.S. PATENT DOCUMENTS

| | | | |
|---|---|---|---|
| 2005/0209120 A1* | 9/2005 | Reinhardt et al. | 510/312 |
| 2005/0233937 A1* | 10/2005 | Greenwood et al. | 510/507 |
| 2007/0072787 A1 | 3/2007 | Hazenkamp et al. | |
| 2007/0093402 A1* | 4/2007 | Assmann et al. | 510/302 |

FOREIGN PATENT DOCUMENTS

| | | |
|---|---|---|
| JP | A-S52-155279 | 12/1977 |
| JP | A-S59-196399 | 11/1984 |
| JP | A-S63-264699 | 11/1988 |
| JP | A-H01-097267 | 4/1989 |
| JP | A-H02-261547 | 10/1990 |
| JP | A-H03-186307 | 8/1991 |
| JP | A-04-031498 | 2/1992 |
| JP | A-H05-025492 | 2/1993 |
| JP | A-H05-125400 | 5/1993 |
| JP | A-H05-209200 | 8/1993 |
| JP | B-05-065189 | 9/1993 |
| JP | A-H05-263098 | 10/1993 |
| JP | A-05-310402 | 11/1993 |
| JP | A-H06-040709 | 2/1994 |
| JP | A-H06-121933 | 5/1994 |
| JP | B-H06-033431 | 5/1994 |
| JP | B-H60-070240 | 9/1994 |
| JP | B-H06-099719 | 12/1994 |
| JP | B-H07-012437 | 2/1995 |
| JP | A-H07-118003 | 5/1995 |
| JP | B-H07-065074 | 7/1995 |
| JP | B-H07-068543 | 7/1995 |
| JP | B-H07-122076 | 12/1995 |
| JP | A-08-041493 | 2/1996 |
| JP | A-H08-067687 | 3/1996 |
| JP | A-08-092597 | 4/1996 |
| JP | A-08-100196 | 4/1996 |
| JP | T-H08-503247 | 4/1996 |
| JP | T-H08-503248 | 4/1996 |
| JP | A-H09-087691 | 3/1997 |
| JP | A-10-236904 | 9/1998 |
| JP | 2871298 | 3/1999 |
| JP | A-11-502549 | 3/1999 |
| JP | 11-106790 | 4/1999 |
| JP | 2918991 | 7/1999 |
| JP | A-2000-153285 | 6/2000 |
| JP | A-2000-192091 | 7/2000 |
| JP | A-2001-172698 | 6/2001 |
| JP | A-2002-146399 | 5/2002 |
| JP | A-2003-089800 | 3/2003 |
| JP | A-2004-331816 | 11/2004 |
| JP | A-2005-170797 | 6/2005 |
| JP | A-2005-206835 | 8/2005 |
| JP | 2007-506853 | 3/2007 |
| JP | B-4024446 | 12/2007 |
| JP | 2008-1736 | 1/2008 |
| JP | 2008-37885 | 2/2008 |
| JP | 2008-104920 | 5/2008 |
| JP | A-2009-149739 | 7/2009 |
| JP | A-2009-149748 | 7/2009 |
| KR | 10-2006-0063785 A | 6/2006 |
| WO | WO 94/11478 | 5/1994 |
| WO | WO 94/11479 | 5/1994 |
| WO | WO 96/26999 A1 | 9/1996 |
| WO | WO 2007/042192 A2 | 4/2007 |
| WO | WO 2008/098921 | 8/2008 |

OTHER PUBLICATIONS

Material Safety Data Sheet—ACC# 36128, Nitrilotriacetic Acid, Mar. 1998.*
IPCS INCHEM—Nitrilotriacetic Acid, ICSC: 1238, May 2003.*
Hage et al. "Efficient manganese catalysts for low-temperature bleaching," *Nature* 369:637-39, (Apr. 1994).
Yoshida et al. New Handbook of Surfactants (Kogaku Toshi Shuppan Co., Ltd.) p. 234 (1991).
Japanese Office Action for JP 2007-327956 mailed Apr. 3, 2012. (English Translation provided).
Yoshida et al. New Handbook of Surfactants (Kogaku Tosho Shuppan Co., Ltd.) p. 234 (1991).
Notification (Information Sheet) for Japanese Patent Application No. 2007-337224 (mailed Jul. 24, 2012).
Office Action for Japanese Patent Application No. 2007-338131 (mailed Jul. 31, 2012).
Notice of Allowance for Japanese Patent Application No. 2007-327957 (mailed Oct. 1, 2013).
Office Action for Korean Patent Application No. 10-2010-7012481 (mailed Jun. 20, 2014).

* cited by examiner

OXIDATION CATALYST FOR BLEACHING, AND BLEACHING COMPOSITION USING THE SAME This application is a National Stage Application of PCT/JP2008/073054,filed 18 Dec. 2008, which claims benefit of Ser. No. 2007-327957, filed 19 Dec. 2007 in Japan and which applications are incorporated herein by reference. To the extent appropriate, a claim of priority is made to each of the above disclosed applications.

TECHNICAL FIELD

The present invention relates to an oxidation catalyst for bleaching, and a bleaching composition using the same. This application claims priority from Japanese Patent Application No. 2007-327957 filed on Dec. 19, 2007, the disclosure of which is incorporated herein by reference.

BACKGROUND ART

Bleach compositions or detergent compositions have been conventionally used for the cleaning of clothing materials, houses and the like. Furthermore, the public awareness of the need for maintaining the cleanliness of clothing materials or the living space has increased recently, so that people are not only doing simple cleaning, but are also increasingly performing sterilization and disinfection using sterilizer and disinfectant compositions.

The bleaching effect, cleaning effect, and sterilizing/disinfecting effect of the compositions used in such applications are manifested by oxidation reactions. Compounds used as components exhibiting one or more of bleaching effect, cleaning effect and sterilizing/disinfecting effect through such an oxidation reaction (hereinafter, may be collectively referred to as oxidation reaction components) include hydrogen peroxide-based compounds such as hydrogen peroxide and inorganic hydrogen peroxide-based compounds that liberate hydrogen peroxide in an aqueous solution, and optionally, depending on the use, chlorine-based compounds such as sodium hypochlorite. In recent years, hydrogen peroxide-based compounds such as hydrogen peroxide have attracted attention from the viewpoint that the compounds can be conveniently used.

In regard to bleaching compositions, detergent compositions or sterilizer/disinfectant compositions, the performance may be insufficient, for example, under low temperature conditions when only the oxidation reaction components are used. Thus, for example, the use of an oxidation reaction component in combination with an oxidation catalyst such as an organic peracid precursor or a metal complex having a characteristic of promoting the oxidation reaction has been suggested (see, for example, Patent Citations 1 to 16).

[Patent Citation 1] Specification of Japanese Examined Patent Application Publication No. 6-33431

[Patent Citation 2] Specification of Japanese Examined Patent Application Publication No. 6-70240

[Patent Citation 3] Specification of Japanese Examined Patent Application Publication No. 6-99719

[Patent Citation 4] Specification of Japanese Patent Application Laid-Open Publication No. 52-155279

[Patent Citation 5] Specification of Japanese Patent Application Laid-Open Publication No. 1-97267

[Patent Citation 6] Specification of Japanese Patent Application Laid-Open Publication No. 2-261547

[Patent Citation 7] Specification of PCT Japanese Translation Publication No. 8-503247

[Patent Citation 8] Specification of PCT Japanese Translation Publication No. 8-503248

[Patent Citation 9] Specification of Japanese Examined Patent Application Publication No. 7-12437

[Patent Citation 10] Specification of Japanese Examined Patent Application Publication No. 7-65074

[Patent Citation 11] Specification of Japanese Examined Patent Application Publication No 7-68543

[Patent Citation 12] Specification of Japanese Examined Patent Application Publication No. 7-122076

[Patent Citation 13] Specification of Japanese Patent Application Laid-Open Publication No. 5-263098

[Patent Citation 14] Specification of Japanese Patent Application Laid-Open Publication No. 6-121933

[Patent Citation 15] Specification of Japanese Patent Application Laid-Open Publication No. 8-67687

[Patent Citation 16] U.S. Pat. No. 5,021,187

[Patent Citation 17] Specification of Japanese Patent Application Laid-Open Publication No. 2005-206835

[Patent Citation 18] Specification of Japanese Patent Application Laid-Open Publication No. 2000-153285

[Patent Citation 19] Specification of Japanese Patent Application Laid-Open Publication No. 2005-170797

[Non-Patent Citation 1] Nature, Vol. 369(1994), pp. 637-639

DISCLOSURE OF INVENTION

Technical Problem

However, conventional oxidation catalysts are not satisfactory in their effects, and when an oxidation catalyst is incorporated into a bleaching composition, the oxidation catalyst causes problems such as promoting the decomposition of a hydrogen peroxide-based compound upon storage stabilization, thereby deteriorating the product quality, and impairing the esthetic appearance of the product because of the coloring of the catalyst itself. Thus, there is a demand for a new oxidation catalyst and a new bleaching composition.

Accordingly, it is an object of the invention to provide a new oxidation catalyst and a bleaching composition using the same.

Technical Solution

The present inventors made a thorough investigation to achieve the objects, and as a result, they found that an oxidation catalyst containing a specific chelate agent and a copper and/or manganese compound exhibits high oxidation promoting effects, and that when the oxidation catalyst is made into a granulated product by using a binder compound, the bleaching composition, more particularly, the hydrogen peroxide-based compound or catalyst itself, obtains excellent storage stability, so that a bleaching effect can be obtained by further combining a bleach activating agent therewith. The inventors also found disinfecting/sterilizing effects against a wide variety of germs, and thus they completed the invention, The invention provides the following steps.

[1] An oxidation catalyst for bleaching, containing a component (a) which is an anion caused from a chelating agent having less than or equal to coordination position 5 and/or the chelating agent, and a component (b) which is a copper and/or manganese compound.

[2] The oxidation catalyst for bleaching according to [1], wherein the component (a) is represented by any of the following formulas (I) to (III),

[Formula 1]

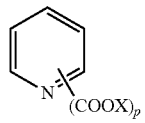
(I)

(wherein in the formula, X represents a hydrogen atom, an alkali metal, or an alkali earth metal; p represents an integer of 1 or 2; when p represents 2, X may be identical or different)

[Formula 2]

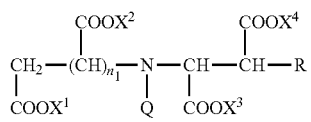
(II)

(wherein in the formula, $X^1$ to $X^4$ may be identical or different, and each represents one member selected from the group consisting of a hydrogen atom, an alkali metal, an alkaline earth metal and a cationic ammonium group; Q represents a hydrogen atom or an alkyl group; R represents a hydrogen atom or a hydroxyl group, and $n_1$ represents 0 or 1)

[Formula 3]

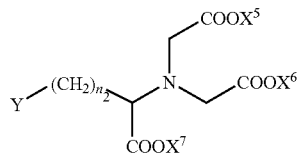
(III)

(wherein Y represents an alkyl group, a carboxyl group, a sulfa group, an amino group, a hydroxyl group or a hydrogen atom; $X^5$ to $X^7$ may be identical or different, and each represents one member selected from the group consisting of a hydrogen atom, an alkali metal, an alkaline earth metal and a cationic ammonium group; and $n_2$ represents an integer from 0 to 5).

[3] The oxidation catalyst for bleaching according to [1] or [2], wherein the component (a) is greater than or equal to 1 equal amount than the component (b) in a molar ratio.

[4] Oxidation catalyst particles containing the oxidation catalyst for bleaching according to any one of [1] to [3], and a binder compound (c).

[5] A bleaching composition containing the components (a) and (b), and the binder compound (c), and a hydrogen peroxide-based compound (d) which generates hydrogen peroxide when dissolved in water, the bleaching composition containing a granulated product or a molded product in which at least the components (b) and (c) are granulated or molded together.

[6] The bleaching composition according to [4], wherein the component (c) is a binder compound selected from (c-1) a polyethylene glycol having an average molecular weight of 2500 to 10000, and a block polymer of ethylene oxide and propylene oxide, and/or (c-2) a nonionic surfactant having an HLB value of 16 or greater as determined by Griffin's method.

[7] The bleaching composition according to [5] or [6], wherein the component (c-1) is a polyethylene glycol having an average molecular weight of 7100 to 9300 and a block polymer of ethylene oxide and propylene oxide.

[8] The bleaching composition according to [5] or [6], wherein the component (c-2) is a nonionic surfactant having an ethylene oxide addition mole number of 40 to 80 and having an HLB value of 16 or greater as determined by Griffin's method.

[9] The bleaching composition according to [5] to [8], further containing a bleach activating agent (e) represented by the following formula (IV):

[Formula 4]

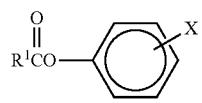
(IV)

(wherein $R^1$ represents a linear alkyl group having 7 to 18 carbon atoms, which may contain a saturated or an unsaturated bond; and X represents —H, —COOM or —$SO_3M$ (M is a cation).

[10] The bleaching composition according to [5] to [9], further containing a surfactant (f).

Advantageous Effects

According to the invention, there can be provided an oxidation catalyst which promotes an effect of oxidizing a hydrogen peroxide-based compound even when used in a trace amount, and is excellent in the effects of suppressing decomposition of a hydrogen peroxide-based compound and suppressing coloration of the catalyst itself, and a bleaching composition containing the oxidation catalyst.

BEST MODE FOR CARRYING OUT THE INVENTION

Hereinafter, the invention will be described in detail.
As used herein, the bleaching composition includes a bleaching agent composition and a bleaching detergent composition. The bleaching agent composition is an agent used while being attached to a tub, a laundry sink or the like, or added together with a detergent upon laundry washing, usually for about 15 minutes to 2 hours, mainly in order to remove stains and soiling due to food and drink adhering to clothes, or to remove yellowish stains of clothes which are generated after long term wear. The bleaching detergent composition is a composition used in laundry washing for 5 to 15 minutes usually in a washing machine, mainly in order to remove sebum stains and blackish stains which adhere to clothes worn daily, or light stains of food and drink adhering to clothes, or to prevent yellowish stains of clothes.

The difference between the bleaching agent composition and the bleaching detergent composition is that a composition focusing on the bleaching power is a bleaching agent composition, while a composition focusing on the cleaning power, even though the bleaching power is inferior to that of a bleaching agent composition, is a bleaching detergent composition. Therefore, the difference in terms of composition is that the bleaching agent composition has a larger content of bleaching components (hydrogen peroxide-based compound, oxidation catalyst for bleaching, and/or bleach activating agent), and the bleaching detergent composition has a larger content of surfactants.

<Oxidation Catalyst (A)>

The oxidation catalyst of the invention (hereinafter, referred to as oxidation catalyst (A)) is a catalyst which exhibits an oxidation promoting effect when used together with an oxidation reactive component that offers a bleaching effect in, for example, a bleaching composition or the like, and is constituted to contain (a) an anion caused from a chelating agent having less than or equal to coordination position 5 and/or the chelating agent (hereinafter, simply referred to as component (a)) and (b) a copper and/or manganese compound (hereinafter, simply referred to as component (b)).

The term "bleaching effect" according to the present specification means an effect of enabling thinning or removal of stains formed as a result of deposition of, for example, a coloring matter such as tea.

It is desirable that the oxidation catalyst (A) of the invention contains at least the component (a) and the component (b) mentioned above, and the oxidation catalyst may be a simple mixture containing these components, or may be a complex formed, with the component (a) coordinating as a ligand. Furthermore, the oxidation catalyst may have these components in a mixed state.

"Component (a)"

An anion Caused froth a chelating agent having less than or equal to coordination position 5 and/or the chelating agent as the component (a) that constitutes the oxidation catalyst (A) of the invention, for example, the following components are used as long as the components contain less than or equal to coordination position 5 that can coordinate into a metal in a molecule.

Inorganic polyphosphate compounds such as tripolyphosphate and the like; phosphonic acids such as 1-hydroxyethane-1,1-diphosphonate, ethane-1,1-diphosphonate, those salts or the like; polycarboxylate such as oxalic acid, succinic acid, those salts or the like; hydroxycarboxylic acid such as citric acid, malic acid, those salts or the like; aminopolycarboxylic acid such as isoserine diacetic acid, those salts or the like are preferably used, particularly the compounds shown in the following formulas (I) to (III) are preferably used.

As a compound represented in the formula (I), 2-pyridinecarboxylic acid, 2,6-pyridinecarboxylic acid (dipicolinic acid), those salts or the like; as a compound represented in the formula (II), iminodisuccinic acid or 3-hydroxy-2,2'-iminodisuccinic acid, those salts or the like: a compound represented in the formula (III), nitrilotriacetic acid, methylglycine diacetic acid, dicarboxymethylglutamic acid, L-aspartic acid-N,N-diacetate, serine-diacetate, those salts or the like, particularly, iminodisuccinic acid is preferably used.

As a salt, an alkali metal salt such as sodium, potassium or the like; alkanol amine salt such as monoethanol amine salt, diethanol amine salt or the like are used. Particularly, sodium or potassium is preferably used.

As the component (a) that constitutes the oxidation catalyst (A) of the invention is an anion caused from a chelating agent having less than or equal to coordination position 5 and/or the chelating agent. Particularly, the compounds (hereinafter, compounds (B) to (D)) shown in any of the following formulas (I) to (III) are preferably Used.

"Compound (B)"

Compound (B) is represented by the following formula (I).

[Formula 5]

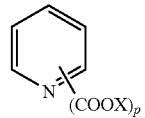

(I)

In a compound (B), X represents a hydrogen atom, an alkali metal, or an alkali earth metal. As an alkali metal, Na, K or the like can be used. As an alkali earth metal, Ca (In this case, "—C(O)O—X" becomes "—C(O)O—Ca$_{1/2}$") or the like can be used.

—"C(O)O-M (M represents an alkali metal or an alkali earth metal)" is represented when X represents an alkali metal or an alkali earth metal. When a compound (B) is inputted in a solution such as water and the like, part or all of the "—C(O)O—M" becomes "—C(O)O—" and an alkali metal or an alkali earth metal ion. Then, "—C(O)O—" forms a complex with "an transition metal ion". Therefore, even if X represents an alkali metal or an alkali earth metal, the component (a) can be used as a component which constitutes the present invention. Particularly, it is preferable for X to be a hydrogen atom.

In addition, in a compound (B), p which represents a number of "—COOX" group represents an integer of 1 or 2, and when p is 2 is more preferable. When p is 2, X may be identical or different.

When p is 1, a binding position to the pyridine ring of the "—COOX" group is preferably α position relative to a nitrogen atom. Even when p is 2, at least one "—COOX" group preferably binds to α position. The remaining "—COOX" group may bind to any of the α position to the γ position, and preferably binds to the other α position.

The compounds in the following formulas (1) and (2) are represented as examples of the compound (B). Note that in the following formulas (1) and (2), X is described as a hydrogen H as a representative example. However, the compound (A) is not limited in this structure and appropriate structures can be selected in order to achieve the object of the invention.

[Formula 6]

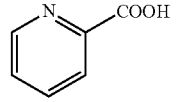

(1)

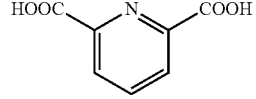

(2)

In addition, as component (a) of the structure having the pyridine ring such as the compound (B), in the formula (I), "—COOX" group of the component (a) can be replaced with a sulfo group (SO$_3$H), an amino group (NH$_2$), a hydroxyl group (OH), nitro group (NO$_2$), a carboxyl group (COOH) or an alkyl group (C$_n$H$_{2n+1}$) having a substituent group.

The alkyl group may be either a linear or a branched chain. The carbon number of the alkyl group is preferably 1 to 30, more preferably 1 to 18. Part of hydrogen atoms of the alkyl group can be replaced with a substituent group. As the substituent group, a sulfo group, an amino group, a hydroxyl group, a nitro group, or the like can be used.

For example, compounds in the following formulas (3) to (10) are represented. The present invention is not limited to these structures, appropriate structures can be selected in order to achieve the object of the invention. Note that, as a representative example, X represents a hydrogen H.

From the point where coordination becomes stable and bleaching power improves, "—COOX" group is preferable.

[Formula 7]

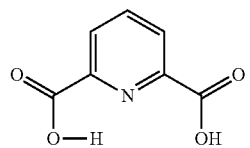
(3)

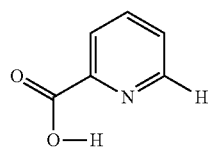
(4)

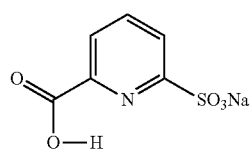
(5)

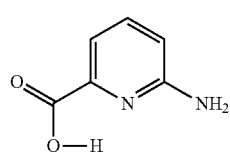
(6)

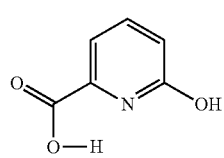
(7)

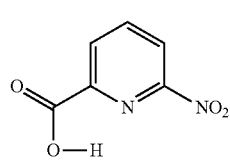
(8)

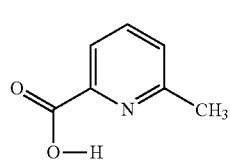
(9)

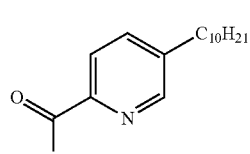
(10)

(Compound (C))

Compound (C) is represented by the following formula (II).

[Formula 8]

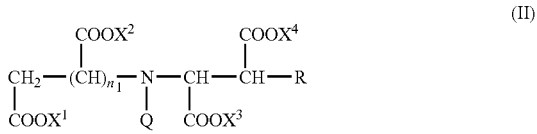
(II)

In compound (C), $X^1$ to $X^4$ may be identical or different, and each represents one member selected from the group consisting of a hydrogen atom, an alkali metal, an alkaline earth metal and a cationic ammonium group.

In case of $X^1$ to $X^4$ of the above, when an oxidation catalyst of the present invention is produced as a form such as a solution mixture, an anion represented by the following formula (11) is formed since —$COOX^1$, —$COOX^2$, —$COOX^3$, and —$COOX^4$ are each ionized to be —$COO^-$ when the compound (C) is inputted into a solution such as water. Then, —$COO^-$ of the anion would be able to form a complex with a copper and/or a manganese of the component (b). $X^1$ to $X^4$ are preferably either sodium or potassium. Note that when at least one member of $X^1$ to $X^4$ is on alkali earth metal M, the —$COO^-$ of the anion will be represented as —$COOM_{1/2}$.

In addition, Q represents a hydrogen atom or an alkyl group, and preferably a hydrogen atom. R represents a hydrogen atom or a hydroxyl group, and preferably a hydroxyl group. $n_1$ represents an integer of 0 or 1, and preferably represents an integer of 1.

[Formula 9]

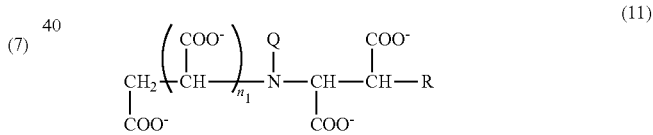
(11)

The compounds in the following formulas (12) to (15) are represented as examples of the compound (C). Note that, in the following formulas (12) and (15), any of $X^1$ to $X^4$ is described as a hydrogen H as a representative example. However, the compound (C) is not limited in this structure and appropriate structures can be selected in order to achieve the object of the invention.

[Formula 10]

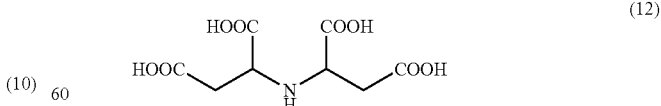
(12)

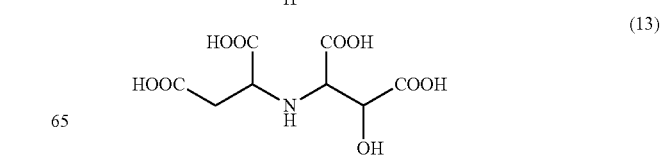
(13)

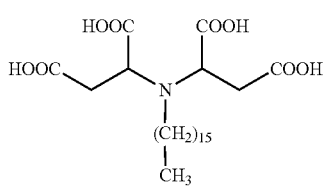

(14)

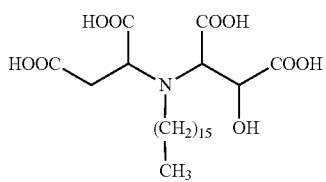

(15)

In addition, as the component (a) of the structure which is similar to the compound (C), the formula (II) can be a structure such that a nitrogen atom (N) may be replaced with an oxygen atom (O), however, a nitrogen atom (N) is preferable since it promotes much higher oxidation effect.

The following formula (16) and (17) are represented as examples of the above. The present invention is not limited to these structures, appropriate structures can be selected in order to achieve the object of the invention. Note that, any of the $X^1$ to $X^4$ is represented as sodium as a representative example.

[Formula 11]

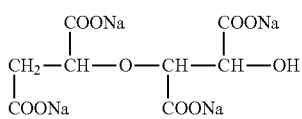

(16)

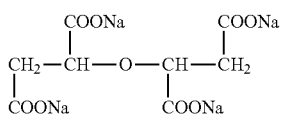

(17)

—$COOX^1$, —$COOX^2$, —$COOX^3$, —$COOX^4$ of the compound (C) may be replaced with an alkyl group, a sulfo group, or an amino group or the like.

The alkyl group may be an alkyl group having a substituent group, and the alkyl group may be either a linear or a branched chain. The carbon number of the alkyl group is preferably 1 to 30, more preferably 1 to 18. Part of hydrogen atoms of the alkyl group can be replaced to a substituent group. As the substituent group, a sulfo group, an amino group, a hydroxyl group, a nitro group, a carboxyl group and the like can be used. From the point where coordination becomes stable and bleaching power improves, carboxyl group is the most preferable.

(Compound (D))

Compound (D) is represented by the following formula (III).

[Formula 12]

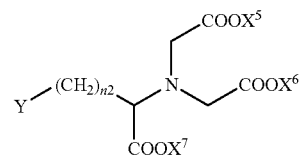

(III)

In addition, in a compound (D), Y represents an alkyl group, a carboxyl group, a sulfo group, an amino group or a hydrogen atom. $X^5$ to $X^7$ may be identical or different, and each represents one member selected from the group consisting of a hydrogen atom, an alkali metal, an alkaline earth metal and a cationic ammonium group.

In case of $X^5$ to $X^7$ of the above, when an oxidation catalyst (A) of the present invention is produced as a form such as a solution mixture, an anion is formed since —$COOX^5$, —$COOX^6$ and —$COOX^7$ are each ionized to be —$COO^-$ when the compound (D) is inputted into a solution such as water. Then, —$COO^-$ of the anion would be able to form a complex with a copper and/or a manganese of the component (b).

$X^5$ to $X^7$ are preferably either sodium or potassium. Note that when at least one member of $X^5$ to $X^7$ are alkali earth metal M, the —$COO^-$ of the anion will be represented as —$COOM_{1/2}$. Furthermore, $n_2$ represents an integer from 0 to 5, and preferably $n_2$ represents an integer from 0 to 2.

The compounds in the following formulas (18) and (30) are represented as examples of the compound (D). Note that, in the following formulas (18) and (30), $X^5$ to $X^7$ are described as a hydrogen as a representative example. However, the compound (D) is not limited in this structure and appropriate structures can be selected in order to achieve the object of the invention.

[Formula 13]

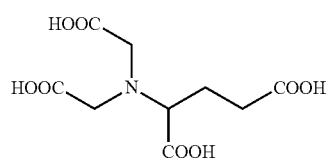

(18)

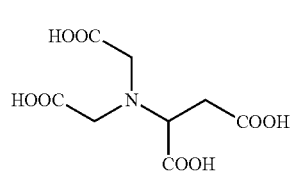

(19)

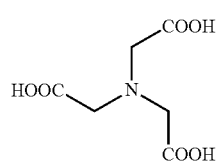

(20)

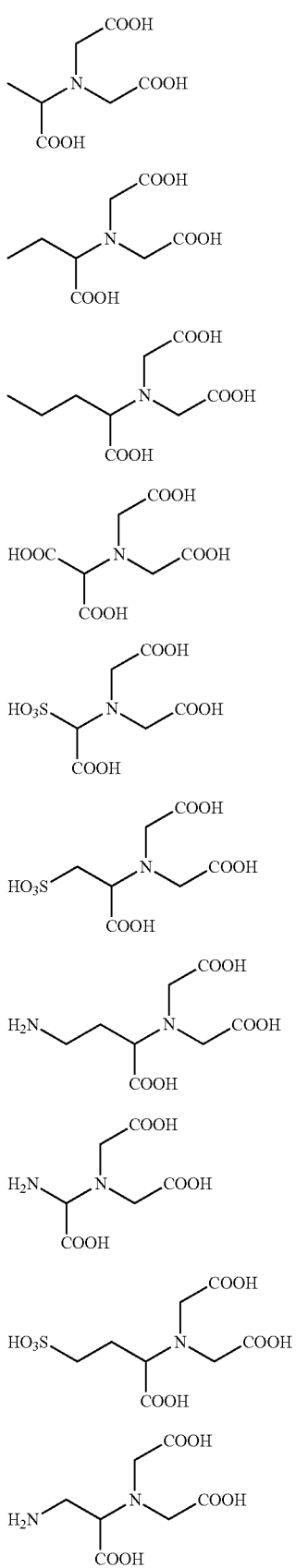

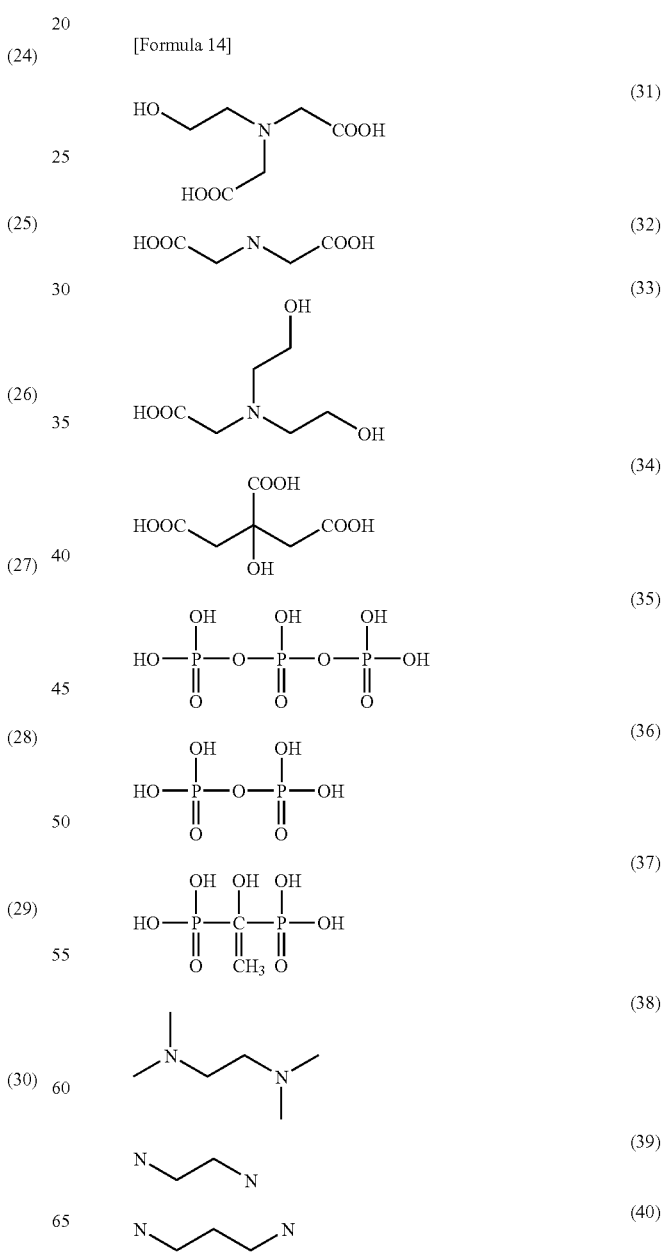

In addition, —COOX$^5$, —COOX$^6$ and —COOX$^7$ of the compound (D) may be replaced with an alkyl group, a sulfo group, or an amino group or the like.

The alkyl group may be an alkyl group having a substituent group, and the alkyl group may be either a linear or a branched chain. The carbon number of the alkyl group is preferably 1 to 30, more preferably 1 to 18. Part of hydrogen atoms of the alkyl group can be replaced with a substituent group. As the substituent group, a sulfo group, an amino group, a hydroxyl group, a nitro group, a carboxyl group or the like can be used.

From the point where coordination becomes stable and bleaching power improves, carboxyl group is the most preferable.

Other than the above compounds, the compounds represented by the following formulas (31) to (53) as a component (a) which consist the present invention can be used.

[Formula 14]

-continued

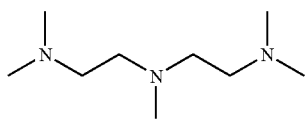 (41)

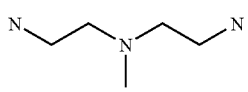 (42)

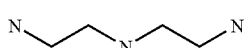 (43)

[Formula 15]

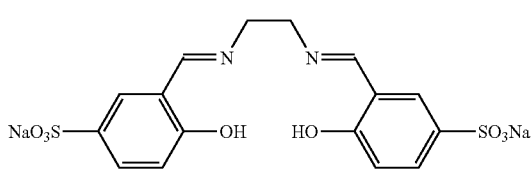 (44)

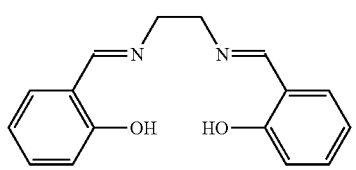 (45)

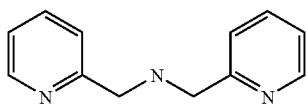 (46)

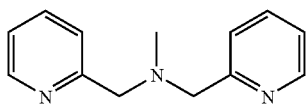 (47)

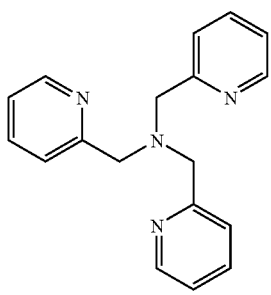 (48)

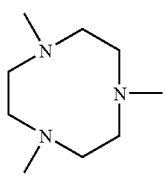 (49)

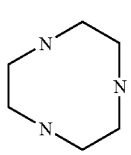 (50)

-continued

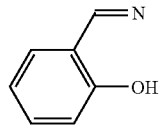 (51)

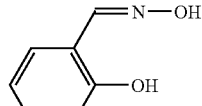 (52)

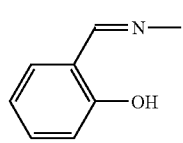 (53)

(Component (b))

As the component (b) that constitutes the oxidation catalyst (A) of the invention, since water is used as the bleaching agent composition or the solvent in many cases, compounds which generate their ions when introduced into water are preferred, and water-soluble metal salts are preferred. Examples of the water-soluble metal salts include nitrate, sulfate, chloride, acetate, perchlorate, cyanide, ammonium chloride, tartrate, and the like, In the case of manganese, manganese nitrate, manganese sulfate, manganese chloride, manganese acetate, manganese perchlorate and the like are preferred. In the case of copper, copper nitrate, copper sulfide, copper sulfate, copper chloride, copper acetate, copper cyanide, copper ammonium chloride, copper tartrate, copper perchlorate, and the like are preferred.

These can be used individually, or in appropriate combination of two or more kinds.

The amount of use of the component (a) with respect to the component (b) is preferably greater than or equal to 1 equal amount, more preferably greater than or equal to 2 molar equivalents, even more preferably greater than or equal to 5 molar equivalents. It is preferable that there is an excess of the component (a) with respect to the component (b), in view of the bleaching effect and suppression of the decomposition of hydrogen peroxide-based compounds.

<Method for Producing Complex>

As a specific method for producing a complex, first, the component (b), and the component (a) which is used as a ligand are added and dissolved in a solvent, and if necessary, an alkali agent is added thereto. The mixture is stirred preferably at room temperature to 100° C., and more preferably at room temperature of about 25° C., and thus these components are reacted (reaction step). The stirring time is preferably 1 minute or longer, preferably 1 minute to 5 hours, and more preferably about 10 minutes. After completion of the reaction step, the solvent is distilled off under reduced pressure from the reaction liquid, and a solid-state complex and a side-produced salt generated in the reaction step are recovered in the form of a mixture (recovery step).

Such a production method is preferable since the method is excellently balanced between the production time, complex yield, convenience and the like, and is advantageous for industrial production. Furthermore, the mixture obtained by the recovery step can be used as an oxidation catalyst in the state as received, without separating side-produced salts. However, in the case where it is necessary to obtain an oxidation catalyst as a complex of higher purity, a recovery method of leaving the reaction liquid obtained by the reaction step to stand for 1 hour to 1 week in a cold and dark place, and separating by filtration precipitates produced, that is, a solid-state complex, may also be employed.

Furthermore, the oxidation catalyst (A) thus obtained may also be used after appropriately adjusting the amount of copper and/or manganese or the amount of the ligand by further adding the component (a) and/or the component (b), or the like.

As the solvent used during the production of the complex, a polar solvent is preferred, and a solvent which can dissolve the component (a) at room temperature and can be distilled off under reduced pressure at 200° C. or below is also preferred. Specific examples include water, ethanol, methanol, isopropanol, acetonitrile, acetone, dimethylacetamide, N,N-dimethylformamide, dimethyl sulfoxide, dimethylacetamide, and the like. Among these, one or more can be used, but from the viewpoints of price, safety, ease of distillation of, and the like, one or more among water, ethanol and methanol are preferred, and particularly, water is preferred.

As the alkali agent, triethylamine, sodium hydroxide, sodium carbonate and the like can be used.

As the component (b), a compound which dissolves in a solvent and generates copper and/or manganese ions is preferred, and in addition to the various water-soluble metal salts previously exemplified, other salts that are soluble in the solvent used (for example, organic solvent-soluble salts and the like), potassium permanganate, or the like can also be used. Since water is preferably used as the solvent as described above, it is preferable to use a water-soluble metal salt as the component (b).

The complex structure formed herein is not particularly limited, and the number of ligands per atom of copper and/or manganese may be one or plural. The number of copper and/or manganese atoms constituting one complex may also be one or plural. That is, the complex may be mononuclear, polynuclear or cluster. Furthermore, when the complex is a polynuclear complex, the transition metal contained therein may be only one of copper and/or manganese element, or may be of plural kinds, as in the case of, for example, copper and manganese being co-present. In the case of a polynuclear complex, the complex may be cross-linked by a cross-linking species such as an oxygen, sulfur or halogen atom.

For these complexes, if at least one anion produced from the component (a) is coordinating copper and/or manganese, another ligand may be further coordinating at the time of actual use of the oxidation catalyst (A). Examples of such another ligand include various functional groups or atoms (for example, a hydroxyl group, a phenolic hydroxyl group, an amino group, a carboxylic acid group, a thiol group, a halogen atom, or the like) in any component that will be described later, which is used upon production of a bleaching composition, water of the solvent, and the like.

When unreacted ligands remain after copper and/or manganese and a ligand formed from the component (a) have been reacted, it is not necessarily necessary to eliminate these unreacted ligands, and they may be used without processing, According to the oxidation catalyst (A) explained above, the oxidation catalyst has an excellent oxidation promoting effect so that it exhibits a significant bleaching effect even with a trace amount, and is excellent in the effect of inhibiting the decomposition of hydrogen peroxide-based compounds. Furthermore, since this oxidation catalyst (A) exhibits high effects particularly even under relative low temperature conditions, the oxidation catalyst can be used without selecting use conditions, and, accordingly, the stability of the catalyst in a state of having formed a complex is also good as described previously, "Component (c): Binder Compound"

The component (c) according to the invention is incorporated as a granulated or molded product together with the component (b), from the viewpoint of storage stability upon storage.

The component (c) according to the invention is preferably selected from polyethylene glycol, a saturated fatty acid having 12 to 20 carbon atoms, a polyacrylic acid having a weight average molecular weight of 1000 to 1000000, a copolymer of acrylic acid and maleic acid, and salts thereof. Furthermore, a polyoxyalkylene alkyl ether having 12 to 20 carbon atoms can also be used.

The polyethylene glycol is preferably polyethylene glycol 1000 to 20000 (average molecular weight 500 to 25000), more preferably one having an average molecular weight of 2600 to 9300, and particularly preferably one having an average molecular weight of 7300 to 9300. The saturated fatty acid having 12 to 20 carbon atoms is preferably a saturated fatty acid having 14 to 20 carbon atoms, and more preferably 14 to 18 carbon atoms, and the polyoxyalkylene alkyl ether having 12 to 20 carbon atoms preferably has an ethylene oxide added mole number of 10 to 50. The average molecular weight of polyethylene glycol according to the invention represents the average molecular weight as described in the Japanese Standards of Cosmetic Ingredients ($2^{nd}$ Edition Annotation). Furthermore, the weight average molecular weight of polyacrylic acid or a salt thereof is a value measured by gel permeation chromatography using polyethylene glycol as a standard substance.

The granulated product may be used together with a surfactant such as an olefin sulfonic acid salt, an alkylbenzene sulfonic acid salt, an alkyl sulfuric acid ester salt, or a polyoxyethylene alkyl ether sulfuric acid ester salt, or a mixture of these, so as to improve the solubility in the washing bath. The content of the surfactant in the granulated product is preferably 0 to 50 mass %, more preferably 3 to 40 mass %, and even more preferably 5 to 30 mass %

As for the polyoxyalkylene alkyl ether, the carbon number of the alkyl group is preferably 10 to 20, and the compound is more preferably an adduct of ethylene oxide (hereinafter, abbreviated to EO) and/or propylene oxide (hereinafter, abbreviated to PO). The average added mole number is, in any of the cases of EO, PO or a mixture of EO and PO, preferably 4 to 20 in total, and more preferably 5 to 15, and the molar ratio of EO/PO is preferably 5/0 to 1/5, and more preferably 5/0 to 1/2.

As the olefin sulfonic acid salt, a sodium or potassium salt of α-olefin sulfonic acid having an alkyl group with 14 to 18 carbon atoms is preferred.

As the alkylbenzene sulfonic acid salt, a sodium or potassium salt of linear alkylbenzene sulfonic acid having an alkyl group with 10 to 14 carbon atoms is preferred. As the alkyl sulfuric acid ester salt, an alkali metal salt such as a sodium salt, having an alkyl group with 10 to 18 carbon atoms, is preferred, and particularly, lauryl sulfuric acid ester sodium or myristyl sulfuric acid ester sodium is preferred.

Furthermore, as the polyoxyethylene alkyl ether sulfuric acid ester salt, a polyoxyethylene alkyl ether sulfuric acid ester salt having an alkyl group with 10 to 18 carbon atoms is preferred, and a sodium salt is good. Here, the average degree of polymerization of an oxyethylene group (hereinafter, the average degree of polymerization is indicated by POE) is preferably 1 to 10, and more preferably 1 to 5, and particularly, polyoxyethylene lauryl ether sulfuric acid ester sodium (POE=2 to 5), or polyoxyethylene myristyl ether sulfuric acid ester sodium (POE=2 to 5) is preferred.

According to the invention, a granulated product of the copper and/or manganese compound can be produced by an arbitrary method. Furthermore, desirable results can be obtained by adding the component (c) in a pre-melted state. At this time, the temperature for melting the component (c) is preferably 40 to 100° C., more preferably 50 to 100° C., and even more preferably 50 to 90° C. These are mixed under stirring until a uniform state is obtained, and then the mixture is formulated by a conventional granulating machine.

Extrusion granulation may be mentioned as a preferred granulation method, and it is preferable to make a granulated product having an average particle size of 100 to 1200 μm, and more preferably 360 to 1000 μm. As another granulation method, making the granules into a tablet shape using a briquetting machine may be mentioned as a preferred granulation method.

Here, the average particle size can be checked according to a method of determining the particle size distribution using a sieve that will be described later, and calculating the particle size from the particle size distribution.

The granulated product of a copper and/or manganese compound may be mixed with a film forming polymer, a zeolite and the like, in addition to the component (c) or the surfactant, and the mixture can be compounded as a granulated product. In the case of adding a surfactant or the like into the granulated product, adjustment may be made by deducting the content of the surfactant from the content of the component (c).

The content of the component (c) according to the invention is not particularly limited, but in the case of a bleaching agent composition, the content is preferably 0.1 to 5 mass %, and more preferably 0.3 to 5 mass % in, the composition. There may be instances where even if the content exceeds the above range, the stability of the hydrogen peroxide-based compound or the damage suppressing effect on clothes is not increased. If the content is less than the above range, there may be instances where the effect of granulation or molding is not obtained, or granulation or molding is difficult. In the case of a bleaching detergent composition, the content is preferably 0.01 to 3 mass %, and more preferably 0.05 to 2 mass % in the composition. There may be instances where even if the content exceeds the above range, the stability of the hydrogen peroxide-based compound or the damage suppressing effect on clothes is not increased, and at the same time a sufficient content of surfactant is not secured, while a sufficient washing effect is not obtained. If the content is less than the above range, there may be instances where the effect of granulation or molding is not obtained, or granulation or molding is difficult.

According to the invention, when the component (b) and the component (c) are together in a granulated product or a molded product without including the component (a), the content of the component (b)/component (c) in the granulated product or molded product is preferably 0,05 to 3 mass %/1 to 99.95 mass %, and more preferably 0.,1 to 1 mass %/1 to 99.9 mass %, from the viewpoint of the stability of the hydrogen peroxide-based compound or the damage to clothes.

According to the invention, when the component (b) and the component (c) are together made into a granulated product or a molded product without including the component (a), the amount of incorporation of the granulated product or molded product into the bleaching composition is not particularly limited.

In the case of a bleaching composition, the amount of incorporation is preferably 1 to 5 mass %, and more preferably 3 to 5 mass % in the composition. There may be instances where even if the amount exceeds the above range, the bleaching effect, the washing effect and the sterilizing/disinfecting effect are not increased. If the amount of incorporation is less than the above range, there may be instances where a bleaching effect, a washing effect and a sterilizing/disinfecting effect are not obtained.

In the case of a bleaching detergent composition, the amount of incorporation is preferably 0.5 to 3 mass %, and more preferably 1 to 3 mass %, in the composition.

There may be instances where even if the amount exceeds the above range, a bleaching effect, a washing effect and a sterilizing/disinfecting effect are not increased, and at the same time, there may be instances where damage to clothes is caused, or a sufficient washing effect is not obtained without securing a sufficient content of surfactant. If the amount is less than the above range, a bleaching effect, a washing effect and a sterilizing/disinfecting effect are not obtained.

Furthermore, in order to further enhance the suppression of damage or discoloration of clothes due to the component (b), and the suppression of decomposition of hydrogen peroxide-based compounds upon stable storage, it is more effective if the component (a) and the component (b) are present as close to each other as possible. Examples of such methods include a method of producing a granulated product of the component (a), the component (b) and the component (c), or forming a complex of the component (a) and the component (b) and then granulating the complex with the component (c); and a method of preliminarily preparing a granulated product or molded product containing the component (b) and the component (d) and then coating the granulated product or molded product with the component (a) or with a component appropriately added to the component (a). Among these, upon considering the convenience of preparation and the production cost, it is particularly preferable to use the composition as a granulated product or molded product containing the component (a), the component (b) and the component (c).

In order to enhance the solubility of the component (b) and to thereby manifest a high-efficiency disinfecting/sterilizing effect, the component (b) and the component (c) may be dissolved and dispersed in water or a solvent, and then the dispersion may be granulated by spraying.

In the case of preparing a granulated product or molded product, a combination of the component (a) and the component (b) with polyethylene glycol 6000 as the component (c) is preferred upon considering the convenience of preparation and the production cost, as well as the suppression of damage or discoloration of clothes, the suppression of decomposition of hydrogen peroxide-based compounds upon storage, and coloration of the catalyst itself.

Furthermore, in order to enhance productivity, an inorganic substance such as sodium sulfate or sodium carbonate, or an organic acid salt such as sodium citrate may be added to the granulated product or molded product.

The method for producing the granulated product is not particularly limited, but examples of the granulation method include a method of extruding the component (a) or component (b) together with the component (c), or a copper complex, and if necessary, a surfactant, an inorganic Salt and the like into a noodle shape having a diameter of about 1 mm using a kneader or an extrude; or molding the components with a drum flake; and then pulverizing the resultant with a pulverizer; and a method of dissolving and dispersing the component (a) or the component (b), and if necessary, the component (f) that will be described later, an inorganic salt or the like in the component (c) that has been melted, cooling and solidifying the dispersion in a mixer to prepare an agglomerated object, and then pulverizing and granulating the agglomerated object to produce a granulated product. Another example may be a method of mixing the component (a), the component (b), the component (f), an inorganic salt and the like using a stirring granulator, a rotating vessel type granulator or a fluid bed granulator, subsequently adding the component (c), and granulating the mixture.

The particle size of the granulated product is not particularly limited, but in view of solubility, stability and the like, the average particle size is preferably 100 to 1200 µm, and particularly preferably 300 to 1000 µm. When the average particle size is less than this range, the solubility is poor, and sufficient effects may not be obtained. Here, the average particle size can be checked according to a method of determining the particle size distribution using a sieve that will be described later, and calculating the particle size from the particle size distribution.

The method for producing the molded product may be, for example, a method of mixing and kneading the component (a), the component (b), the component (c) or a copper or manganese complex and the component (c), and if necessary, the component (f), an inorganic salt and the like using a mixer or a kneading machine, subsequently extruding the mixture through a multi-hole die or a screen using an extrusion molding machine, and cutting the product to obtain a pellet-shaped molded product Furthermore, a method of mixing the component (a), the component (b), the component (c), and if necessary, a surfactant, an inorganic compound and the like, subsequently compression molding the mixture with a tabletting machine or a briquetting machine, and if necessary, further pulverizing the product with a pulverizer to adjust the size, can also be used. In addition to this, a bleaching agent composition or a bleaching detergent composition may be prepared by preliminarily preparing a mixture of the component (a), the component (b), the component (c), or other necessary components, supplying the mixture and the other components of the bleaching agent composition or bleaching detergent composition to a tabletting machine (millstone) and compression molding the mixture.

According to the invention, in the case of preparing a granulated product or molded product from the component (a), the component (b) and the component (c) together, the respective contents of the component (a)/component (b)/component (c) in the granulated product or molded product are preferably 1 to 50 mass %/0.5 to 10 mass %/20 to 98.5 mass %, and more preferably 25 to 45 mass %/1 to 5 mass %/30 to 74 mass %. The content of the component (a) is preferably in the above range from the viewpoints of a bleaching effect, a washing effect, a sterilizing/disinfecting effect, or storage stability, damage to clothes or discoloration, and coloration of the catalyst itself. The content of the component (b) is preferably in the above range from the viewpoints of storage stability, and damage to clothes or discoloration. The content of the component (c) is preferably in the above range from the viewpoints of storage stability, maintenance of productivity or shape, and solubility.

According to the invention, in the case of preparing a granulated product or molded product from the component (a) and the component (b) together with the component (c) as a copper or manganese complex, the contents of the complex/component (c) in the granulated product is preferably 2 to 60 mass %/30 to 98 mass %, and more preferably 20 to 40 mass %/30 to 80 mass %.

According to the invention, in the case of producing a granulated product or a molded product from the component (a), the component (b) and the component (c) together, or in the case of producing a copper or manganese complex from the component (a) and the component (b) and then producing a granulated product or molded product from the complex together with the component (c), the amount of incorporation of the granulated product or molded product in the bleaching composition is not particularly limited.

In the case of a bleaching agent composition, the amount of incorporation is preferably 0,5 to 5 mass %, and more preferably 2 to 5 mass %, in the composition. There may be instances where even if the amount exceeds the above range, the disinfecting/sterilizing effect is not increased, and at the same time, it may not be preferable from the viewpoints of the stability of hydrogen peroxide-based compounds or damage to clothes. If the amount is less than the above range, there are instances where the disinfecting/sterilizing effect is not obtained, In the case of a bleaching detergent composition, the amount of incorporation is preferably 0.1 mass % to 3 mass %, and more preferably 0.3 to 2 mass %, in the composition. There may be instances where even if the amount exceeds the above range, the disinfecting/sterilizing effect is not increased, and at the same time, damage to clothes is caused, the effect against gram-positive bacteria is decreased, or a sufficient washing effect cannot be obtained without securing a sufficient content of surfactant. If the amount is less than the above range, a bleaching effect, a washing effect, and a sterilizing/disinfecting effect may not be obtained.

Furthermore, in the case of including a radical trapping agent such as 4-methoxyphenol for the purpose of increasing the effect of preventing damage to clothes or discoloration, the content thereof is preferably equal to or more than 1 mass % to less than 10 mass %, and more preferably 1 to 5 mass %, in the granulated product or molded product. Furthermore, in the case of preparing a granulated product or molded product by an extrusion granulation method, when an organic or inorganic salt such as sodium citrate, sodium sulfate or sodium carbonate is contained so as to enhance productivity by adjusting the viscosity, or when an aluminosilicate such as A-type Zeolite is contained as a pulverization aid, the content is preferably 3 to 50 mass %, and more preferably 5 to 40 mass %, in the granulated product or molded product. When a radical trapping agent or an organic or inorganic salt is contained, adjustment may be made by deducting the content of the radical trapping agent or the organic or inorganic salt from the content of the component (c), similarly to the case where other components are contained.

In addition to that, adjustment may be made by deducting the content of a pigment or a dye from the content of the component (c), similarly to the case where a pigment or a dye is contained.

Among the granulated products or molded products containing the component (b) and component (c), it is particularly preferable to use them as a granulated product or molded product containing the component (a), the component (b) and the component (c), without forming a complex, from the viewpoints of the stability of hydrogen peroxide-based compounds, damage to clothes, convenience of preparation, product cost, and the like, When the component (a), the component (b) and the component (c) as explained above are used in combination, a bleaching effect, a washing effect, and a sterilizing/disinfecting effect are significantly exhibited with a trace amount, and when at least the component (b) and the component (c) are granulated or molded together and incorporated in the form of a granulated product or a molded product, the effect of suppressing decomposition of hydrogen peroxide-based compounds is excellent. Furthermore, this bleaching composition exhibits high effects particularly even under relatively low temperature conditions, and thus the bleaching composition can be used without selecting use conditions.

"Component (d): Hydrogen Peroxide-based Compound that Dissolves in Water and Generates Hydrogen Peroxide"

The component (d) of the invention is a hydrogen peroxide-based compound which dissolves in water and generates hydrogen peroxide. Specific examples of the component (d) include sodium percarbonate, sodium perborate, sodium perborate trihydrate, and the like, and it is preferable to use sodium percarbonate from the viewpoints of solubility at the time of use or stability upon storage. Concerning sodium percarbonate, coated sodium percarbonate is more preferable to further improve the stability upon storage. Particularly, sodium percarbonate coated with silicic acid and/or silicate and boric acid and/or borate, or sodium percarbonate coated with a combination of a surfactant such as LAS and an inorganic compound is preferable.

Specifically, it is preferable to use a compound coated by spraying an aqueous solution of silicic acid and/or a silicic acid alkali metal salt, an aqueous solution of boric acid and/or a boric acid alkali metal salt, and the like as described in Japanese Patent No. 2918991 or the like; the compound coated with an aromatic hydrocarbon sulfonic acid, and/or a silicic acid alkali salt, a carbonate, a bicarbonate and a sulfate having an average particle size of 10 to 500 μm of Japanese Patent No. 2871298; a compound coated with a water-insoluble organic compound such as paraffin or wax, or to use a powder blend with various inorganic substances such as sodium carbonate and sodium hydrogen carbonate, to make the compound non-dangerous.

Furthermore, in the case of a composition, particularly a bleaching detergent composition, having a large quantity of moisture in the composition due to incorporation of a surfactant, it is more preferable to use a hydrogen peroxide-based compound prepared by coating sodium percarbonate with silicic acid and sodium borate, an aromatic hydrocarbon sulfonic acid and silicic acid alkali salt, a hydrogen peroxide-based compound coated with a carbonate, a bicarbonate and a sulfate. These hydrogen peroxide-based compounds can be used individually or in appropriate combination of two or more kinds.

Other examples of the production method of coated sodium carbonate include the methods described in Japanese Patent Application Laid-Open Publication No. 59-196399, U.S. Pat. No. 4,526,698 (both relating to sodium percarbonate with a borate), as well as Japanese Patent Application Laid-Open Publication No.4-31498, Japanese Patent Application Laid-Open Publication No.6-40709,Japanese Patent Application Laid-Open Publication No. 7-118003 and Japanese Patent No. 2871298. The average particle size of the inorganic hydrogen peroxide-based compound is preferably 200 to 1000 μm, and more preferably 500 to 1000 μm. In order to satisfy both solubility and stability, it is preferable that the content of the particles having a particle size of less than 125 μm and the particles having a particle size exceeding 1400 μm is 10 mass % or less in the component (d). Here, the average particle size can be checked by a method of determining the particle size distribution using a sieve that will be described below, and calculating the particle size distribution. Upon considering the stability of hydrogen peroxide-based compound compounds in the bleaching detergent composition, it is preferable that the moisture content is 2 mass % or less.

The content of the component (d) according to the invention is not particularly limited, but in the case of a bleaching agent composition, the content is preferably 20 to 90 mass %, more preferably 25 to 90 mass %, and even more preferably 30 to 90 mass %, in the composition. There may be instances where even if the content exceeds the above range, a disinfecting/sterilizing effect, or a bleaching effect against the stains adhering to clothes and yellowish stains of clothes which are generated after long-term wear, is not increased. If the content is less than the above rang; there may be instances where a disinfecting/sterilizing effect, or a sufficient bleaching effect against stubborn stains are not obtained. In the case of a bleaching detergent composition, the content is preferably 1 to 20 mass %, and more preferably 2 to 20 mass %, in the composition. When the content exceeds the above range, a disinfecting/sterilizing effect, a bleaching effect against light stains, or an effect of preventing yellowish stains of clothes may not be increased any further, and at the same time, a sufficient washing effect may not be obtained, without securing a sufficient content of surfactant. Also, when the content is less than the above range, a disinfecting/sterilizing effect or a bleaching effect may be insufficient in the bleaching detergent composition.

"Component (e): Bleach Activating Agent"

The bleach activating agent according to the invention is a bleach activating agent represented by the following formula (IV).

[Formula 16]

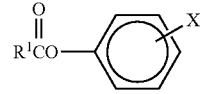

(IV)

wherein R1 represents a linear alkyl group having 7 to 18 carbon atoms, which may contain a saturated or unsaturated bond; and X represents —H, —COOM or —SO$_3$M (M is a cation).

According to the invention, when the component (e), that is, the bleach activating agent represented by the above formula (IV), is used together in addition to the component (a), the component (b) and the component (d), a disinfecting/sterilizing effect against gram-negative bacteria and gram-positive bacteria can be manifested, and a high effect on a wide variety of bacteria can be expected. The disinfecting/sterilizing effect of bleach activating agents against gram-positive bacteria such as *Staphylococcus aureus* is conventionally known, but there has been a problem that when the bleach activating agent is used in combination with a transition metal salt such as the component (b) in the presence of the component (d), the effect of the agent is lowered. However, it was found that when the bleach activating agent is used in combination with the particular component (a), the effect is exhibited against both the gram-negative bacteria and the gram-positive bacteria.

The component (e) used in the invention is an organic peracid precursor, and is a compound generating organic peracid by the action of a hydrogen peroxide-based compound. Specific examples of the component (e) include sodium octanoyloxybenzene sulfonate, sodium nonanoyloxybenzene sultanate, sodium decanoyloxybenzene sulfonate, sodium undecanoyloxybenzene sulfonate, sodium dodecanoyloxybenzene sultanate, octanoyloxybenzoic acid, nonanoyloxybenzoic acid, decanoyloxybenzoic acid, undecanoyloxybenzoic acid, dodecanoyloxybenzoic acid, octanoyloxybenzene, nonanoyloxybenzene, decanoyloxybenzene, undecanoyloxybenzene, dodecanoyloxybenzene, and the like.

Among these bleach activating agents, decanoyloxybenzoic acid, sodium dodecanoyloxybenzene sulfonate, sodium nonanoyloxybenzene sulfonate and the like, which generate C9-C12 organic peracids, are preferable from the viewpoint of the disinfecting/sterilizing effect, and 4-decanoyloxybenzoic acid and sodium 4-dodecanoyloxybenzene sulfonate are preferable from the viewpoint of the effect of causing discoloration on clothes.

According to the invention, the component (e) is preferably incorporated as a granulated product or molded product, in view of storage stability upon storage. The content of the bleach activating agent in the granulated product or molded product is preferably 30 to 95 mass %, and more preferably 50 to 90 mass %. If the content is out of this range, it may be difficult to obtain the effect of granulation sufficiently.

These are preferably made into a granulated product or molded product using a binder compound selected from polyethylene glycol, a saturated fatty acid having 12 to 20 carbon atoms, a polyacrylic acid having a weight average molecular weight of 1000 to 1000000, and salts thereof.

The polyethylene glycol is preferably polyethylene glycol 1000 to 20000 (average molecular weight 500 to 25000), more preferably a polyethylene glycol having an average molecular weight of 2600 to 9300, and even more preferably having an average molecular weight of 7300 to 9300.

Furthermore, the saturated fatty acid having 12 to 20 carbon atoms is preferably a saturated fatty acid having 14 to 20 carbon atoms, and more preferably 14 to 18 carbon atoms.

The average molecular weight of polyethylene glycol according to the invention represents the average molecular weight described in the Japanese Standards of Cosmetic Ingredients ($2^{nd}$ Edition Annotation). Furthermore, the weight average molecular weight of polyacrylic acid or a salt thereof is a value measured by gel permeation chromatography using polyethylene glycol as a standard substance. Such a binder material is used in an amount of 0.5 to 30 mass %, preferably 1 to 20 mass %, and more preferably 5 to 20 mass %, in the granulated product.

For the granulated product, it is preferable to use it together with a surfactant, such as a polyoxyalkylene alkyl ether, an olefin sulfonic acid salt, an alkylbenzene sulfonic acid salt, an alkylsulfuric acid ester salt, or a polyoxyethylene alkyl ether sulfuric acid ester salt, or mixtures thereof, so as to improve solubility of the bleach activating agent in the washing bath, and the content of the surfactant in the granulated product is preferably 0 to 50 mass %, more preferably 3 to 40 mass %, and even more preferably 5 to 30 mass %.

The polyoxyalkylene alkyl ether is preferably an adduct of ethylene oxide (hereinafter, abbreviated to EO) and/or propylene oxide (hereinafter, abbreviated to PO), preferably having an alkyl group having 10 to 15 carbon atoms. The average added mole number is preferably 4 to 30, and more preferably 5 to 15, in total, for any of EO, PO or a mixture of EO and PO. The molar ratio of EO/PO is preferably 5/0 to 1/5, and more preferably 5/0 to 1/2.

The olefin sulfonic acid salt is preferably a sodium salt or potassium salt of α-olefin sulfonic acid having an alkyl group having 14 to 18 carbon atoms. The alkylbenzene sulfonic acid salt is preferably a sodium salt or potassium salt of linear alkylbenzene sulfonic acid having an alkyl group having 10 to 14 carbon atoms. Furthermore, the alkyl sulfuric acid ester salt is preferably one having an alkyl group having 10 to 18 carbon atoms, more preferably an alkali metal salt such as a sodium salt, and even more preferably lauryl sulfuric acid ester sodium or myristyl sulfuric acid ester sodium. The polyoxyethylene alkyl ether sulfuric acid ester salt is preferably a polyoxyethylene alkyl ether sulfuric acid ester salt having an alkyl group having 10 to 18 carbon atoms, and more preferably a sodium salt. Here, the average degree of polymerization of the oxyethylene group (hereinafter, the average degree of polymerization is indicated as POE) is preferably 1 to 10, and more preferably 1 to 5, and even more preferably, the salt is polyoxyethylene lauryl ether sulfuric acid ester sodium (POE=2 to 5) or polyoxyethylene myristyl ether sulfuric acid ester sodium (POE=2 to 5).

According to the invention, the granulated product of the bleach activating agent can be produced by any method. Furthermore, more preferable results can be obtained by preliminarily melting the component (c) and adding it. At this time the temperature of melting the component (c) is preferably 40 to 100° C., more preferably 50 to 100° C., and even more preferably 50 to 90° C. These are mixed with stirring until a uniform state is obtained, and then the mixture is formulated by a conventional granulating machine. As a preferred granulation method, extrusion granulation may be mentioned, and it is preferable to make a granulated product having an average particle size of 500 to 5000 μm, and preferably 500 to 3000 μm. Furthermore, as another granulation method, shaping into tablets by a briquetting machine may also be mentioned as a preferable granulation method.

Here, the bleach activating agent is known to cause hydrolysis in the presence of an alkali component and moisture in the bleaching agent or bleaching detergent during storage, thereby losing the bleaching and disinfecting effect. Thus, according to the invention, it is more preferable to mix the bleach activating agent with a film formable polymer, a zeolite or the like, in addition to the component (c), the component (f) that will be described later, an inorganic salt or the like, and to incorporate it as a granulated product, in order to prevent such decomposition.

The component (e) of the invention can be used as a granulation product or molded product with the component (a), the component (b) or a complex thereof in the bleaching agent composition and the bleaching detergent composition.

The amount of incorporation of the component (e) in the bleaching composition is not particularly limited, but in the case of a bleaching agent composition, the amount of incorporation is preferably 1 to 5 mass %, and more preferably 3 to 5 mass %, in the composition. There may be instances where even if the amount of incorporation exceeds the above range, the disinfecting/sterilizing effect is not increased. When the amount is less than the above range, there may be instances where a sufficient disinfecting/sterilizing effect is not obtained. In the case of a bleaching detergent composition, the amount of incorporation is preferably 0.1 to 3 mass %, and more preferably 0.1 to 2 mass %, in the composition. There may be instances where the disinfecting/sterilizing effect is not increased, and at the same time, damage to clothes is caused, or a sufficient washing effect is not obtained without securing a sufficient content of surfactants. When the amount of incorporation is less than the above range, there may be instances where a disinfecting/sterilizing effect is not obtained.

"Component (f): Surfactant"

The component (1) of the invention is a surfactant. The component (f) is essential in the case of the bleaching detergent composition, and it is preferable to include the, component (f) in the case of the bleaching agent composition. Specific examples of the surfactant include anionic surfactants, nonionic surfactants, cationic surfactants, amphoteric surfactants and the like, and these can be used individually or in appropriate combination of two or more kinds.

Examples of the anionic surfactant include the following.

(1) A linear or branched alkyl benzene sulfonic acid salt (LAS or ABS) having an alkyl group having 8 to 18 carbon atoms.

(2) An alkanesulfonic acid salt having 10 to 20 carbon atoms.

(3) An α-olefin sulfonic acid salt (AOS) having 10 to 20 carbon atoms.

(4) An alkyl sulfate or alkenyl sulfate (AS) having 10 to 20 carbon atoms.

(5) An alkyl (or alkenyl) ether sulfate (AES) having a linear or branched alkyl (or alkenyl) group having 10 to 20 carbon atoms added with any alkylene oxide having 2 to 4 carbon atoms or with an average of 0.5 to 10 moles of ethylene oxide and propylene oxide (molar ratio EO/PO=0.1/9.9 to 9.9/0.1).

(6) An alkyl (or alkenyl) phenyl ether sulfate having a linear or branched alkyl (or alkenyl) group having 10 to 20 carbon atoms added with any alkylene oxide having 2 to 4 carbon atoms or with an average of 3 to 30 moles of ethylene oxide and propylene oxide (molar ratio EO/PO=0.1/9.9 to 9.9/0.1).

(7) An alkyl (or alkenyl) ether carboxylate having a linear or branched alkyl (or alkenyl) group having 10 to 20 carbon atoms added with any alkylene oxide having 2 to 4 carbon atoms or with an average of 0.5 to 10 moles of ethylene oxide and propylene oxide (molar ratio EO/PO=0.1/9.9 to 9.910.1).

(8) An alkyl polyhydric alcohol ether sulfate having 10 to 20 carbon atoms, such as alkyl glyceryl ether sulfonic acid.

(9) A saturated or unsaturated α-sulfo fatty acid salt having 8 to 20 carbon atoms, or a methyl, ethyl or propyl ester thereof (α-SF or IVIES).

(10) A long-chain monoalkyl, dialkyl or sesquialkyl phosphoric acid salt.

(11) A polyoxyethylene monoalkyl, dialkyl or sesquialkyl phosphoric acid salt.

(12) A higher fatty acid salt (soap) having 10 to 20 carbon atoms.

These anionic surfactants can be used in the form of a salt of alkali metal such as sodium or potassium, an amine salt, an ammonium salt or the like. Furthermore, these anionic surfactants may be used as a mixture, Suitable examples of the anionic surfactant include alkali metal salts (for example, sodium or potassium salt, and the like) of linear alkylbenzene sulfonic acid (LAS); alkali metal salts (for example, sodium or potassium salt, and the like) of AOS, MES, AS and AES; alkali metal salts (for example, sodium or potassium salt, and the like) of higher fatty acids, and the like, and it is particularly preferable to contain MES having a carbon chain length of 14 to 18.

The nonionic surfactant is not particularly limited if it is a nonionic surfactant conventionally used in detergents, and various nonionic surfactants can be used. Examples of the nonionic surfactant include the following.

(1) A polyoxyalkylene alkyl (or alkenyl) ether formed by adding an average of 3 to 30 moles, preferably 4 to 20 moles and more preferably 5 to 17 moles, of alkylene oxide having 2 to 4 carbon atoms to an aliphatic alcohol having 6 to 22 carbon atoms, and preferably 8 to 18 carbon atoms. Among these, polyoxyethylene alkyl (or alkenyl) ether, and polyoxyethylene polyoxypropylene alkyl (or alkenyl) ether are suitable. Examples of the aliphatic alcohol used herein include a primary alcohol and a secondary alcohol. The alkyl group may have a branched chain. The aliphatic alcohol is preferably a primary alcohol.

(2) A polyoxyethylene alkyl (or alkenyl) phenyl ether.

(3) A fatty acid alkyl ester alkoxylate represented by, for example, the following formula (V), formed by adding alkylene oxide between ester bonds of long-chain fatty acid alkyl esters.

[Formula 17]

$$R^9CO(OA)_nOR^{10} \qquad (V)$$

(wherein $R^9CO$ represents a fatty acid residue having 6 to 22 carbon atoms, and preferably 8 to 18 carbon atoms; OA represents an alkylene oxide addition unit having 2 to 4 carbon atoms, and preferably 2 to 3 carbon atoms, such as ethylene oxide or propylene oxide; n represents the average added mole number of alkylene oxide, and is a number generally from 3 to 30, and preferably 5 to 20; and $R^{10}$ represents a lower alkyl group having 1 to 3 carbon atoms, which may be substituted.)

(4) A polyoxyethylene sorbitan fatty acid ester.
(5) A polyoxyethylene sorbite fatty acid ester.
(6) A polyoxyethylene fatty acid ester.
(7) A polyoxyethylene hardened castor oil.
(8) A glycerin fatty acid ester.
(9) A fatty acid alkanolamide.
(10) A polyoxyethylene alkylamine.
(11) An alkyl glycoside.
(12) An alkylamine oxide.

Among the nonionic surfactants, a polyoxyethylene alkyl (or alkenyl)ether and a polyoxyethylene polyoxypropylene alkyl (or alkenyl)ether, a fatty acid methyl ester ethoxylate formed by adding ethylene oxide to a fatty acid methyl ester; a fatty acid methyl ester ethoxypropoxylate formed by adding ethylene oxide and propylene oxide to a fatty acid methyl ester; and the like, each having a melting point of 40° C. or less and an HLB value of 9 to 16, are suitably used. These nonionic surfactants can be used individually, or in appropriate combination of two or more kinds.

The HLB value of the nonionic surfactant according to the invention is a value determined by Griffin's method (see Yoshida, Shindo, Ohgaki and Yamanaka, co-ed., "New Handbook of Surfactants", Kogaku Tosho Shuppan Co., Ltd. (1991), p. 234).

The melting point according to the invention is a value measured according to a freezing point measurement method described in JIS K8001 "General Rule of Reagent Test Methods."

The cationic surfactant is not particularly limited if it is a cationic surfactant conventionally used in detergents, and various cationic surfactants can be used. Examples of the cationic surfactant include the following.

(1) A di-long-chain alkyl-di-short-chain alkyl type quaternary ammonium salt.

(2) A mono-long-chain alkyl-tri-short-chain alkyl type quaternary ammonium salt.

(3) A tri-long-chain alkyl-mono-short-chain alkyl type quaternary ammonium salt.

(the long-chain alkyl represents an alkyl group having 12 to 26 carbon atoms, and preferably 14 to 18 carbon atoms; the short-chain alkyl represents an alkyl group having 1 to 4 carbon atoms, and preferably 1 to 2 carbon atoms, a benzyl group, a hydroxyalkyl group having 2 to 4 carbon atoms, and preferably 2 to 3 carbon atoms, or a polyoxyalkylene group.

The amphoteric surfactant is not particularly limited if it is an amphoteric surfactant, conventionally used in detergents, and various amphoteric surfactants can be used.

The invention is not intended to be limited to the above surfactants, and these can be used individually or in appropriate combination of two or more kinds.

In the bleaching composition of the invention, the component (f) is preferably prepared in the form of surfactant-containing particles, as separate particles from the components (b) and (c), and particularly, it is more preferable that the component (f) is prepared as separate particles from the components (a), (b) and (c), excluding the surfactant used as a base agent for granulation of the component (c).

The method for producing surfactant-containing particles that are suitable for use in the bleaching agent composition, which is a bleaching composition of the invention, can be largely divided into two types, such as surfactant-containing particles having an anionic surfactant as a main surfactant, and surfactant-containing particles having a nonionic surfactant as a main surfactant.

The method for producing surfactant-containing particles that are suitable for use in the bleaching detergent composition, which is a bleaching composition of the invention, can be largely divided into two types, such as surfactant-containing particles having an anionic surfactant as a main surfactant, and surfactant-containing particles having a nonionic surfactant as a main surfactant.

(Surfactant-containing Particles Having Anionic Surfactant as Main Surfactant)

The surfactant-containing particles having an anionic surfactant as a main surfactant according to the invention mean particles which have an anionic surfactant as an essential component and have the largest content of the anionic surfactant among the surfactant components incorporated in the particles. Therefore, other surfactants such as a nonionic surfactant, a cationic surfactant and an amphoteric surfactant, in addition to the anionic surfactant, can also be suitably incorporated, even though the contents are limited.

Regarding the anionic surfactant used in the surfactant-containing particles having an anionic surfactant as a main surfactant, various anionic surfactants can be used without particular limitation, as long as they are conventionally used in detergents, as described for the component (f).

In the surfactant-containing particles having an anionic surfactant as a main surfactant, the surfactant is such that an anionic surfactant is used as a main surfactant, and conventionally one or two or more kinds of anionic surfactants can be used in combination.

The content of all surfactant compounds in the surfactant-containing particles having an anionic surfactant as a main surfactant is preferably 10 to 90 weight %, more preferably 15 to 70 mass %, and even more preferably 15 to 50 mass %, in the surfactant-containing particles from the viewpoint of imparting sufficient washing performance. Furthermore, the mass ratio of the anionic surfactant/other surfactant is 100/0 to 50/50, preferably 100/0 to 55/45, and more preferably 95/5 to 70/30.

In the surfactant-containing particles having an anionic surfactant as a main surfactant, those various additives and auxiliary components mentioned above can be used without particular limitation.

Among these, examples of an inorganic builder, include potassium salts such as potassium carbonate and potassium sulfate, and alkali metal chlorides such as potassium chloride and sodium chloride, which also have an effect of enhancing solubility. Among these, potassium carbonate, or an alkali metal chloride such as potassium chloride or sodium chloride is preferable in view of the balance between the solubility enhancing effect and the cost.

In the case of incorporating potassium carbonate, the content is preferably 1 to 15 mass %, more preferably 2 to 12 mass %, and even more preferably 5 to 10 mass %, in the surfactant-containing particles from the viewpoint of solubility enhancing effect In the case of incorporating an alkali metal chloride, the content is preferably 1 to 10 mass %, more preferably 2 to 8 mass %, and even more preferably 3 to 7 mass %, in the surfactant-containing particles from the viewpoint of solubility enhancing effect.

The property values of the surfactant-containing particles having an anionic surfactant as a main surfactant are not particularly limited, but the volume density is usually 0.3 g/mL or greater, preferably 0.5 to 1.2 g/mL, and more preferably 0.6 to 1.1 g/mL.

The average particle size is preferably 200 to 1500 μm, and more preferably 300 to 1000 μm. If the average particle size is less than 200 μm, dust is likely to be generated, and if the average particle size is greater than 1500 μm, solubility may be insufficient.

Furthermore, the fluidity of the surfactant-containing particles is suitably 60° or less, and particularly suitably 50° or less, in terms of the angle of repose. When the angle of repose exceeds 60°, handlability of the particles may be deteriorated. The angle of repose can be measured by a method for measuring the angle of repose according to a so-called elimination method, which measures the angle formed by the horizontal planes of sliding surfaces that are formed when particles filled in a vessel flow out.

The surfactant-containing particles having an anionic surfactant as a main surfactant can be obtained roughly according to the following two methods.

(1) A method of granulating a neutralized salt type anionic surfactant.

(2) A method of granulating by dry neutralizing an acid precursor of an anionic surfactant.

(1) In the method of granulating a neutralized salt type anionic surfactant, the particles can be obtained according to the following granulation methods.

(1-1) An extrusion granulation method of granulating by beating and kneading raw material powders of detergent components and a binder compound (surfactants, water, liquid polymer components and the like), and then extruding, (1-2) a beating/pulverizing granulation method of granulating by beating and kneading components, and then pulverizing the resulting solid detergent, (1-3) a stirring granulation method of granulating by adding a binder compound to raw material powders, and stirring the mixture with a stirring blade, (1-4) a tumbling granulation method of granulating by spraying a binder compound while tumbling raw material powders, (1-5) a fluid bed granulation method of granulating by spraying a liquid binder while fluidizing raw material powders, and the like.

(2) In the method of granulating by dry neutralizing an acid precursor of an anionic surfactant, it is required to perform granulation by neutralizing an acid precursor of an anionic surfactant and an alkaline inorganic powder while contacting and mixing the components. However, basically, a granulation method that is used in the (1) method of granulating a neutralized salt type anionic surfactant is similarly suitably used. The specific method, apparatus, conditions and the like are as described previously.

In regard to a suitable acid precursor of an anionic surfactant, any acid precursor can be suitably utilized if it is an acid precursor of an anionic surfactant that can be suitably used as described above. Furthermore, the alkaline powder as a neutralizing agent is not particularly limited, but examples include an alkali metal carbonate, an alkali metal silicate, an alkali metal phosphate and the like. Examples of the alkali metal carbonate include sodium carbonate, potassium carbonate, sodium hydrogen carbonate, potassium hydrogen carbonate, sodium-potassium carbonate, and the like. Examples of the alkali metal silicate include sodium silicate, layered sodium silicate, and the like.

Examples of the alkali metal phosphate include sodium tripolyphosphate, sodium pyrophosphate, and the like. Among these, an alkali metal carbonate is preferred, and among them, sodium carbonate, potassium carbonate and sodium-potassium carbonate are particularly preferred. These can be used individually or in combination of two or more kinds.

Surfactant-containing particles having an anionic surfactant as a main surfactant that have been granulated by the methods described above, can be sorted as necessary, and only those surfactant-containing particles having a desired particle size can be used in products.

(Surfactant-containing Particles Having Nonionic Surfactant as a Main Surfactant)

The surfactant-containing particles having a nonionic surfactant as a main surfactant according to the invention mean particles containing a nonionic surfactant as an essential component, and having the largest content of the nonionic surfactant among the surfactant components incorporated in the particles. Therefore, the particles can be incorporated with other surfactants such as an anionic surfactant, a cationic surfactant and an amphoteric surfactant other than the nonionic surfactant even though the contents are limited.

Regarding the nonionic surfactant, various nonionic surfactants can be used without particular limitation. Nonionic surfactants such as those mentioned for the component (f) can be used As the nonionic surfactant in the surfactant-containing particles having a nonionic surfactant as a main surfactant, a polyoxyethylene alkyl (or alkenyl) ether, a polyoxyethylene polyoxypropylene alkyl (or alkenyl) ether, a fatty acid methyl ester ethoxylate having ethylene oxide added to a fatty acid methyl ester, and a fatty acid methyl ester ethoxypropoxylate having ethylene oxide and propylene oxide added to a fatty acid methyl ester, each having a melting point of 40° C. and an HLB value of 9 to 16, are preferred. In addition to that, also for other surfactants such as anionic surfactant, cationic surfactant and amphoteric surfactant, those mentioned for the component (d) can be suitably used. The surfactants can be used individually or in appropriate combination of two or more kinds, and one or two or more kinds of nonionic surfactants can be usually used in combination as when a nonionic surfactant is used as a main surfactant.

The content of all activator compounds in the surfactant-containing particles having a nonionic surfactant as a main surfactant is preferably 5 to 85 mass %, and more preferably 10 to 60 mass %, in the surfactant-containing particles from, the viewpoint of imparting sufficient cleaning performance. The mass ratio of the nonionic surfactant/other surfactant is 100/0 to 50150, preferably 100/0 to 60/40, and more preferably 95/5 to 70/30.

As the component (f) contained in the surfactant-containing particles having a nonionic surfactant as a main surfactant, inorganic and organic washing builders may be mentioned. In regard to the washing builder, the washing builders mentioned above that can be incorporated into the surfactant-containing particles having an anionic surfactant as a main surfactant can be used similarly. The same applies to suitable examples of the washing builder and the content of the washing builder.

Furthermore, in the surfactant-containing particles having a nonionic surfactant as a main surfactant, it is preferable that an oil-absorbing carrier for supporting the nonionic surfactant, a clay mineral as an auxiliary granulating agent or the like is incorporated.

As the oil-absorbing carrier, an oil-absorbent substance having an amount of oil absorption, as indicated by the JIS-K5101 test method, of preferably 80 mL/100 g or more, and more preferably 150 to 600 mL/100 g, is suitably used. Examples of such an oil-absorbing carrier include the components described in, for example, Japanese Patent Application Laid-Open Publication No.5-125400 or Japanese Patent Application Laid-Open Publication No.5-209200.

These oil-absorbing carriers can be used individually or in combination of two or more kinds. The oil-absorbing carrier is contained in an amount of preferably 0.1 to 25 mass %, more preferably 0.5 to 20 mass %, and even more preferably 1 to 15 mass %, in the surfactant-containing particles having a nonionic surfactant as a main surfactant.

The clay mineral is preferably one which belongs to the Smectite group, and has a dioctahedral trilayer structure or a trioctahedral type trilayer structure. The clay mineral that can be used as a detergent component of the invention is a clay mineral having an amount of oil absorption of preferably less than 80 mL/100 g, and more preferably 30 to 70 mL/100 g, and a volume density of preferably 0.1 g/mL or more, and more preferably 0,2 to 1.5 g/mL.

Specific examples of such a clay mineral include the components described in JP-A No. 9-87691.

The clay mineral is contained in an amount of preferably 0,1 to 30 mass %, more preferably 0.5 to 20 mass %, and even more preferably 1 to 10 mass %, in the surfactant-containing particles having a nonionic surfactant as a main surfactant.

In the surfactant-containing particles having a nonionic surfactant as a main surfactant used in the invention, those which can be suitably incorporated into the surfactant-containing particles having an anionic surfactant as a main surfactant can be similarly used as the various additives and auxiliary components.

The property values of the surfactant-containing particles having a nonionic surfactant as a Main surfactant are not particularly limited, but the volume density is usually 0.3 g/mL or greater, preferably 0.5 to 1.2 g/mL, and more preferably 0.6 to 1.1 g/mL. The average particle size is preferably 200 to 1500 μm, and more preferably 300 to 1000 μm. If the average particle size is less than 200 μm, dust is likely to be generated, and if the average particle size is greater than 1500 μm, solubility may be insufficient. Furthermore, the fluidity of the surfactant-containing particles is suitably 60° or less, and particularly suitably 50° or less, in terms of the angle of repose. When the angle of repose exceeds 60°, handlability of the particles may be deteriorated.

The surfactant-containing particles having a nonionic surfactant as a main surfactant can also be obtained according to the granulation methods described above, in the same manner as in the surfactant-containing particles having an anionic surfactant as a main surfactant.

As such, in the case of using the surfactant-containing particles, the bleaching agent composition and bleaching detergent composition, which are bleaching compositions of the invention, can be prepared by mixing the surfactant-containing particles having an anionic surfactant as a main surfactant and/or the surfactant-containing particles having a nonionic surfactant as a main surfactant, with other components, The property values of the bleaching agent composition and the bleaching detergent composition finally obtained are not particularly limited, but the volume density is usually 0.3 g/mL or more, preferably 0.4 to 1.2 g/mL, and more preferably 0.5 to 1.0 g/mL. The average particle size is preferably 200 to 1500 μm, and more preferably 300 to 1000 μm. If the average particle size is less than 200 μm, dust is likely to be generated, and if the average particle size is greater than 1500 μm, solubility may be insufficient. Furthermore, the fluidity of the surfactant-containing particles is suitably 60° or less, and particularly suitably 50° or less, in terms of the angle of repose. When the angle of repose exceeds 60°, handlability of the particles may be deteriorated.

The content of the surfactant in the component (f) contained in the bleaching detergent composition is preferably 10 to 50 mass %, more preferably 15 to 40 mass %, and even more preferably 15 to 35 mass %, in the bleaching detergent composition from the viewpoint of imparting sufficient washing performance. Furthermore, the total amount of the anionic surfactant and the nonionic surfactant is preferably 50 mass % or more, more preferably 80 mass % or more, and even more preferably 95 mass % or more, of the total amount of surfactants, In regard to the component (f), surfactants that are used can be further incorporated into the granulated product or molded product, as well as into the bleaching detergent composition for the purpose of enhancing the solubility of hydrophobic components (fragrance and the like) in the bleaching agent composition or enhancing the penetrability into clothes. The content is preferably 0,1 to 15 mass %, and more preferably 0.2 to 10 mass %.

(Optional Components)

In the bleaching agent composition and the bleaching detergent composition of the invention, various additives can be incorporated if necessary, in a range of not having adverse effects on the effect of the invention, in addition to the components (a), (b), (c), (d), (e) and (f). Specific examples will be shown, below, "Washing Builder"

Inorganic and organic washing builders may be mentioned as the optional component contained in the bleaching agent composition and the bleaching detergent composition.

(Inorganic Builder)

Examples of the inorganic builder include alkali metal carbonates such as sodium carbonate, potassium carbonate, sodium bicarbonate and sodium sesquicarbonate; alkali metal sulfites such as sodium sulfite and potassium sulfite; crystalline alkali metal silicates such as crystalline layered sodium silicate (for example, trade name [Na-SKS-6] ($\delta$-Na$_2$O.2SiO$_2$) manufactured by Clariant Japan K.K.); non-crystalline alkali metal silicates; sulfates such as sodium sulfate and potassium sulfate; alkali metal chlorides such as sodium chloride and potassium chloride; crystalline aluminosilicate, amorphous aluminosilicate, and the like.

Among the inorganic builders, sodium carbonate, potassium carbonate, sodium silicate and aluminosilicate are preferred.

In regard to the aluminosilicate, any of crystalline compounds and non-crystalline (amorphous) compounds can be used, but a crystalline aluminosilicate is preferable in view of cation exchange capability. As the crystalline aluminosilicate, A-type, X-type, Y-type and P-type zeolites and the like can be suitably incorporated, and the average primary particle diameter is preferably 0.1 to 10 μm. The content of the crystalline aluminosilicate is preferably 1 to 40 mass %, and particularly preferably 2 to 30' mass %, of the bleaching detergent composition from the viewpoints of washing power and powder properties such as fluidity.

In the case of incorporating a crystalline alkali metal silicate into the bleaching detergent composition, the content is preferably 0.5 to 40 mass %, more preferably 1 to 25 mass %, even more preferably 3 to 20 mass %, and particularly preferably 5 to 15 weight %, in view of washing power.

(Organic Builder)

Examples of the organic builder include polyacrylic acid salt, polyacrylic acid, an acrylic acid-allyl alcohol copolymer, an acrylic acid-maleic acid copolymer, a hydroxyacrylic acid polymer, polysaccharide oxides such as starch, cellulose, amylose and pectin; polysaccharide derivatives such as carboxymethylcellulose; and the like.

Among these organic builders, polyacrylic acid salt and an acrylic acid-maleic acid copolymer are preferred, and particularly, a salt of an acrylic acid-maleic acid copolymer having a molecular weight of 1000 to 80000, or a salt of polyacrylic acid is suitable. The content of the organic builder is preferably 0.5 to 20 mass %, more preferably 1 to 10 mass %, and even more preferably 2 to 5 mass %, in the bleaching detergent composition.

The washing builders can be used individually or in appropriate combination of two or more kinds. For the purpose of improving washing power, and the dispersibility of stains in the washing liquid, it is preferable to use an organic builder such as a polyacrylic acid salt or an acrylic acid-maleic acid copolymer salt, and an inorganic builder such as zeolite in combination. The content of the washing builder is preferably 10 to 80 mass %, and more preferably 20 to 75 mass %, in the bleaching detergent composition so as to impart sufficient cleaning properties.

"Fragrance"

As the fragrance, the components described in Japanese Patent Application Laid-Open Publication No. 2002-146399 or Japanese Patent Application Laid-Open Publication No. 2003-89800 can be used.

The fragrance composition is a mixture formed from a fragrance component, a solvent, a fragrance stabilizer and the like. In the case of incorporating the fragrance composition into the bleaching composition of the invention, the content is preferably 0.001 to 20 mass %, and more preferably 0.01 to 10 mass %, in the bleaching agent composition and the bleaching detergent composition.

In the case of incorporating the fragrance component in the bleaching composition of the invention, it is preferable to use the fragrance component by spraying or adding dropwise in a mixer, and is more preferable to use the component by spraying, in the surfactant-containing particles during preparation of the surfactant-containing particles or in the finally obtained bleaching agent composition and bleaching detergent composition.

"Colorant"

Various colorants can be used to make the external appearance of the composition good. As the colorant used in the bleaching agent composition and the bleaching detergent composition, a dye or a pigment may be mentioned, but among them, a pigment is preferred from the viewpoint of storage stability, and a pigment having oxidation resistance, such as an oxide, is particularly preferred. Preferable compounds include titanium oxide, iron oxide, cobalt phthalocyanine, Indigo, Prussian Blue, and the like. These colorants are preferably granulated together with a complex, and in this case, it is preferable to use a product formed by dissolving or dispersing the colorant in a binder compound such as polyethylene glycol (PEG).

"Fluorescent Whitening Agent"

Examples of the bleaching composition of the invention include, as fluorescent dyes, a 4,4'-bis-(2-sulfostyryl)-biphenyl salt, a 4,4'-bis-(4-chloro-3-sulfostyryl)-biphenyl salt, a 2-(styrylphenyl)naphthothiazole derivative, a 4,4'-bis(triazol-2-yl)stilbene derivative, a bis-(triazinylaminostilbene) disulfonic acid derivative, and the like.

Examples that can be contained include, in their trade names, Whitex SA, Whitex SKC (manufactured by Sumitomo Chemical Co., Ltd.), Tinopal AMS-GX, Tinopal DBS-X, Tinopal CBS-X (manufactured by Ciba Specialty Chemicals, Inc.), Lemonite CBUS-3B (Khyati Chemicals), and the like. Among these, Tinopal CBS-X and Tinopal AMS-GX are more preferred, and the content is preferably 0.001 to 1 mass %. These may be used individually, or in combination of two or more kinds.

"Enzyme"

Examples of the enzyme (essentially enzymes which achieve an enzymic action during a washing process) include, as classified in terms of the reactivity of enzymes, hydrolases, oxidoreductases, lyases, transferases, and isomerases, and these can all be applied to the invention. Particularly preferred examples include protease, esterase, lipase, nuclease, cellulase, amylase, pectinase and the like. Specific examples of the protease include pepsin, trypsin, chymotrypsin, collagenase, keratinase, elastase, subtilisin, BPN, papain, bromelain, carboxypeptidases A and B, aminopeptidase, asparagilopeptidases A and B, and the like. Commercially available products include Savinase, Alkalase, Everlase, Kannase (manufactured by Novozymes AS), API 21 (manufactured by Showa Denko K.K.), Maxacal, Maxapem (manufactured by Genencor International), protease K-14 or K-16 described in Japanese Patent Application Laid-Open Publication No, 5-25492 and the like. Specific examples of the esterase include gastric lipase, pancreatic lipase, plant lipases, phospholipases, cholinesterases, phosphatases and the like. Specific examples of the lipase include commercially available lipases such as Lipolase, Lipex (manufactured by Novozymes AS), Liposam (manufactured by Showa Denko K.K.), and the like. Furthermore, celluloases include commercially available Cellzyme (manufactured by Novozymes AS), the cellulases described in claim 4 of Japanese Patent Application Laid-Open Publication No. 63-264699, and the like. Examples of the amylase include commercially available Termamil, Duramyl (manufactured by Novozymes AS), and the like. The enzymes can be used individually or in appropriate combination of two or more kinds. Furthermore, it is suitable to use the enzyme which has been separately granulated as stable particles, in a state of being dry blended into detergent dough (particles).

"Enzyme Stabilizer"

The bleaching composition of the invention can have a calcium salt, a magnesium salt, a polyol, formic acid, a boron compound and the like incorporated therein as enzyme stabilizers. Among these, sodium tetraborate, calcium chloride and the like are more preferable, and the content is preferably 0.05 to 2 mass % in the composition. These can be used individually or in combination of two or more kinds.

"Other Polymers"

As a binder or a powder physicality agent in the case of high densification, polyethylene glycol having an average molecular weight of 200 to 200000, an acrylic acid and/or maleic acid polymer having a weight average molecular weight of 1000 to 100000, polyvinyl alcohol, a cellulose derivative such as carboxymethylcellulose, and the like can be incorporated in order to further impart an effect of preventing recontamination by hydrophobic fine particles. Furthermore, as a stain discharging agent, a copolymer or terpolymer of terephthalic acid with an ethylene glycol unit and/or propylene glycol unit can be incorporated, or polyvinylpyrrolidone and the like can be incorporated to impart an effect of preventing color transfer. Among these, polyethylene glycol having an average molecular weight of 1500 to 7000 is preferable, and the content is preferably 0.05 to 5 mass %. These can be used individually or in appropriate combination of two or more kinds.

"Caking Preventing Agent"

As the caking preventing agent, a para-toluenesulfonic acid salt, a xylenesulfonic acid salt, an acetic acid salt, a sulfosuccinic acid salt, talc, finely powdered silica, clay, magnesium oxide and the like can be incorporated.

"Antifoaming Agent"

As the antifoaming agent, conventionally known antifoaming agents, for example, those of silicone/silica-based agents can be used. An antifoaming agent granulated product which has been produced according to a method described in the lower left column of page 4 of Japanese Patent Application Laid-Open Publication No. 3-186307 to be explained below, may be used. First, 20 g of silicone (compound type, PS antifoam) manufactured by Dow Corning Co., Ltd. was added to 100 g of maltodextrin (dextrin modified with enzyme) manufactured by Nippon Starch Chemical Co., Ltd., as an antifoaming component and mixed to obtain a homogeneous mixture. Then, 50 mass % of the resultant homogeneous mixture, 25 mass % of polyethylene glycol (PEG-6000, melting point: 58° C.) and 25 mass % of neutral anhydrous mirabilite are mixed at 70 to 80° C., and then the mixture is granulated with an extrusion granulator (Model EXKS-1) manufactured by Fuji Paudal Co, Ltd. to obtain a granulated product.

The bleaching composition of the invention can be incorporated with any component that is generally incorporated into medical cleaning agents, disinfectant/sterilizing agent as necessary, in a scope of not obstructing the effects of the invention.

The method of using the bleaching composition of the invention is not particularly limited. However, as the method of use, if the composition is a bleaching agent composition, it is preferable to use it by charging it together with a detergent into a washing machine to make a solution of 0.02 to 0.5 mass %, and washing articles to be washed, or immersing them in a solution of 0.02 to 2 mass %, or the like. In particular, the bleaching composition can be used for immersion washing in an immersion, time period of about 15 minutes to 12 hours and preferably about 15 to 60 minutes. In the case of the bleaching detergent composition, it is preferable to use it by charging in a washing machine to make a solution of 0.02 to 0.2% by mass and washing articles to be washed, or by immersing them in a solution of 0.02 to 2% by mass, or the like. In particular, the composition can be suitably used by charging it in a washing machine and performing washing for 5 to 20 minutes.

The form of the bleaching composition of the invention is a solid such as powder, granules, tablets, briquettes, sheets or bars and more preferably powder. The preparation method of the bleaching composition of the invention is not particularly limited, and for example, as described above, they can be prepared according to conventional methods for respective forms, except for appropriately granulating or molding as necessary the above-mentioned components. Containers considering the usability, stability and the like depending on the respective forms are used for commercialization, but in particular, it is preferable to select containers which exert little influence on the decomposition of a hydrogen peroxide-based compound by moisture or light.

The bleaching composition of the invention is not particularly limited in terms of articles to be washed and the use method, and for example, when the bleaching agent composition and the bleaching detergent composition of the present invention are used on textile products such as clothes, fabrics, sheets and curtains; paper products such as wood pulp; hard surfaces of table wares and glasses, washing machine tubs and the like, in the same manner as conventional bleaching agent compositions and bleaching detergent compositions, then microorganisms such as bacteria adhering thereto, or smear, organic stain, yellowing substances, stain, fungi and the like can be bleached, washed and disinfected/sterilized.

Mode for the Invention

Hereinafter, the present invention will be described in more detail based on Examples, but the invention is not intended to be limited to these Examples.

COMPLEX PREPARATION EXAMPLE

"Preparation of Copper Complex L1"

In 300 ml of ion-exchanged water, 1.0 g of a copper (II) sulfate pentahydrate (manufactured by Kanto Chemical Co., Inc.) and 19 g of a 3-hydroxy-2,2'-iminodisuccinic acid 4 sodium salt (manufactured by Nippon Shokubai Co., Ltd.) were added, and the mixture was stirred for 10 minutes at room temperature. Subsequently, water was distilled off under reduced pressure from an oil bath held at 150° C., and a mixture (copper complex L1) of a 3-hydroxy-2,2'-iminodisuccinic acid copper complex and the 3-hydroxy-2,2'-iminodisuccininic acid was obtained in the form of dried product.

"Preparation of Copper Complex L2"

In 300 ml of ion-exchanged water, 1.0 g of a copper (II) sulfate pentahydrate (manufactured by Kanto Chemical Co., Inc.) and 19 g of methylglycinediacetic acid 3 sodium salt (manufactured by BASF) were added, and the mixture was stirred for 10 minutes at room temperature. Subsequently, water was distilled off under reduced pressure from an oil bath held at 150° C., and a mixture (copper complex L2) of a methylglycinediacetic acid copper complex and the methylglycinediacetic acid was obtained in the form of dried product.

"Preparation of Copper Complex L3"

In 300 ml of ion-exchanged water, 1.0 g of a copper (II) sulfate pentahydrate (manufactured by Kanto Chemical Co., Inc.) and 19 g of 2,6-pyridinedicarboxylic acid (manufactured by MERCK KGaA) were added, and the mixture was stirred for 10 minutes at room temperature. Subsequently, water was distilled off under reduced pressure from an oil bath held at 150° C., and a mixture (pyridinedicarboxylic acid-Cu complex (copper complex L3))of a 2,6-pyridinedicarboxylic acid copper complex and the 2,6-pyridinedicarboxylic acid was obtained in the form of dried product.

"Preparation of Copper Complex L4"

In 300 ml of ion-exchanged water, 1.0 g of a copper (II) sulfate pentahydrate (manufactured by Kanto Chemical Co., Inc.) and 19 g of 2,2-iminodisuccinic acid 4 sodium salt (manufactured by LANXESS) were added, and the mixture was stirred for 10 minutes at room temperature. Subsequently, water was distilled off under reduced pressure from an oil bath held at 150° C., and a mixture (copper complex L4)) of a 2,2-iminodisuccinic acid copper complex and the 2,2-iminodisuccinic acid was obtained in the form of dried product.

"Preparation of Manganese Complex M1"

In 300 ml of ion-exchanged water, 1.0 g of a manganese (II) sulfate pentahydrate (manufactured by Kanto Chemical Co., Inc.) and 19 g of 2,2-iminodisuccinic acid 4 sodium salt (manufactured by LANXESS) were added, and the mixture was stirred for 10 minutes at room temperature. Subsequently, water was distilled off under reduced pressure from an oil bath held at 150° C., and a mixture (manganese complex M1) of a 2, 2-iminodisuceinic acid manganese complex and the 2,2-iminodisuccinic acid was obtained in the form of dried product.

"Preparation of Manganese Complex M2"

Other than using a 0.82 g of a manganese (II) sulfate pentahydrate instead of using a 0.84 g of a copper (II) sulfate pentahydrate, 2,2'-iminodisuccinic acid manganese complex was obtained in a similar fashion with the example 1. In 300 ml of ion-exchanged water, 1.0 g of a manganese (II) sulfate pentahydrate (manufactured by Kanto Chemical Co., Inc.) and 19 g of methylglycinediacetic acid 3 sodium salt (manufactured by BASF) were added, and the mixture was stirred for 10 minutes at room temperature. Subsequently, water was distilled off under reduced pressure from an oil bath held at 150° C., and a mixture (manganese complex M2) of a methylglycinediacetic acid manganese complex and the methylglycinediacetic acid was obtained in the form of dried product "Preparation of Bleaching Composition 1"

In Table 3, chelate/metal (Cu, Mn or Co)/binder compounds 1 to 11 were prepared by the following method with use of the component (a), the component (b), the component (c) and if necessary, the component (f). In Table 4, chelate/metal (Cu or Mn)/binder compounds 1 to 20 were prepared by the following method with use of the component (a), the component (b), the component (c) and if necessary, the component (f). The compositions of each component were represented in Table 3 and Table 4. Note that, regarding the chelate/metal (Cu)/binder granulated products 7, 8, 9 in Table 3 and the chelate/metal (Cu)/binder granulated product 14 in Table 4, the complex (including the chelate agent) prepared by the following preparation example was used instead of the component (a) and the component (b).

Preparation Example for Cu/Binder Granulated Products I and II

The respective components of (b) copper compound and (c) binder compound were used to prepare Cu/binder granulated products I and II by the method shown below. The compositions of the respective components are indicated in Table 1.

TABLE 1

| | Metal | | Binder | |
|---|---|---|---|---|
| | Type | Proportion | Type | Proportion |
| Granulated product I | $CuSO_4$ | 2.5 | PEG6000 | 97.5 |
| Granulated product II | $CuSO_4$ | 10 | PEG6000 | 90 |

500 g in total of the component (b) and the component (c) were previously mixed in a powdered state to the proportions indicated in Table 1, and the mixture was charged into a continuous kneader (Model S-1, manufactured by Kurimoto, Ltd.) and kneaded at 65° C. Then, the kneaded product was extruded through a multi-hole screen having a hole diameter of 1 mm, and thereby a noodle-shaped solid substance was obtained.

This solid substance was pulverized using a pulverizer New Speed Mill, manufactured by Okada Seiko Co., Ltd), and thus Cu/binder granulated products I and II were obtained.

The obtained Cu/binder granulated products I and II were all sorted with a sieve, and the particles having a particle size of 300 to 700 μm were used to perform an evaluation as shown below.

Preparation Example for Cu/Binder Granulated Product III

Various components such as the component (b), the component (c) and the component (f) were used to prepare a Cu/binder granulated product III by the method shown below. The compositions of the respective components are shown in Table 2.

TABLE 2

| Component | Type | Proportion |
|---|---|---|
| Metal | CuSO₄ | 0.1 |
| Binder | Polymer A | 1.5 |
| Others | MES | 11 |
| | LAS-Na | 0.7 |
| | LAS-K | 0.3 |
| | Soap | 4 |
| | Nonionic surfactant | 4 |
| | A-type Zeolite | 15 |
| | Sodium carbonate | balance |
| | Potassium carbonate | 5 |
| | Fluorescent whitening agent | 0.1 |
| | Sodium sulfate | 13 |
| | Fragrance | 0.2 |
| | Moisture | 7 |

First, water was introduced into a jacketed mixing tank equipped with a stirring device, and the temperature was adjusted to 60° C. All surfactants except MES and the nonionic surfactant, and copper sulfate were added thereto, and the mixture was stirred for 10 minutes. Subsequently, sodium salt of an acrylic acid/maleic acid copolymer (polymer A) was added, and the mixture was stirred for another 10 minutes. Then, a portion of powdered A-type Zeolite (excluding A-type Zeolite for addition upon kneading in an amount corresponding to 7.0% (relative to each particle group, the same hereinafter). A-type Zeolite for pulverization preparation in an amount corresponding to 3.2%, and A-type Zeolite for surface coating in an amount corresponding to 1.5%), sodium carbonate, potassium carbonate, sodium chloride and sodium sulfate were added thereto. Furthermore, the mixture was stirred for 20 minutes to prepare a slurry for spray drying having 38% moisture, and then the slurry was spray dried under the conditions of a hot air temperature of 280° C. using a counter-current type spray drying column. Thus, spray-dried particles having an average particle size of 290 μm, a volume density of 0.32 g/mL and 5% moisture were obtained, "Method for Measuring Average Particle Size"

As a method for measuring the average particle size, first, a sorting operation was carried out for the object of measurement (sample) using sieves piled in 9 layers, each having a mesh size of 1,680 μm, 1,410 μm, 1,190 μm, 1,000 μm, 710 μm, 500 μm, 350 μm, 250 μm or 149 μm, and a receiving pan.

The sorting operation was conducted with the receiving pan on bottom, piling up 9 layers from the smallest-mesh sieve to the largest-mesh sieve on top and 100 g/time of the sample was placed on the 1,680 μm-mesh sieve on top with its cover on, which was attached to Re-Tap Sieve Shaker (manufactured by Iida & Seisakusho Co., Ltd., tapping: 156 times/min, rolling: 290 times/min). It was shaken for 10 minutes, and then the sample remaining in the sieves and the receiving pan was collected from each sieve and the mass of the sample was measured.

As the mass-frequency of the sample remaining on the receiving pan and the sieves was added up, and, the mesh size of that first sieve giving an added mass-frequency of 50% or more was designated as "a μm", the mesh size one size larger than "a μm" was designated as "b μm", the added sum of the mass-frequency added from the sample remaining on the receiving pan to the sample remaining in the sieve with a mesh size of "a μm" was designated as "c %", and the mass-frequency of the sample on the sieve with a mesh size of "a μm" was designated as "d %". The average particle size (mass 50%) was determined by the following expression (1).

[Expression 1]

$$\text{Average particle size (particle size of 50 mass \%)} = 10^{[50-\{c-d/(\log b - \log a) \times \log b\}]/\{d/(\log b - \log a)\}} \quad (1)$$

On the other hand, a portion of the nonionic surfactant (25% relative to MES) was added to the aqueous slurry (moisture concentration 25%) of MES, and the mixture was concentrated under reduced pressure using a thin film type dryer until the moisture content reached 11%. Thus, a mixed concentrate of MES and the nonionic surfactant was obtained.

The dried particles mentioned above, this mixed concentrate, A-type Zeolite in an amount corresponding to 7.0%, the remaining nonionic surfactant excluding the surfactant for spray addition in an amount corresponding to 0.5%, the fluorescent whitening agent and water were charged into a continuous kneader (Model KRC-S4, manufactured by Kurimoto, Ltd.), and the mixture was kneaded under the conditions of a kneading ability of 120 kg/h and a temperature of 60° C., to obtain a surfactant-containing kneaded product. This surfactant-containing kneaded product was cut with a cutter (circumferential speed of cutter 5 m/s) while being extruded using a pelleter double (Model EXDFJS-100, manufactured by Fuji Paudal Co, Ltd.) equipped with a die having a hole diameter of 10 mm, to obtain a pellet-shaped surfactant-containing molded product having a length of about 5 to 30 mm.

Subsequently, A-type Zeolite as a pulverization aid was added in an amount corresponding to 3.2% to the obtained pellet-shaped surfactant-containing molded product, and the mixture was pulverized using a Fitmill (DKA-3, manufactured by Hosokawa Micron Corp.) arranged in 3 stages in series (screen hole diameter: first stage/second stage/third stage=12 mm/6 mm/3 mm, speed of rotation: 4700 rpm for all of first stage/second stage/third stage), in the co-presence of cool wind (10° C.,15 m/s). Finally, A-type Zeolite in an amount corresponding to 1.5% was added to a horizontal cylindrical tumbling mixer (a mixer having two baffles having a height of 45 mm high and its clearance of 20 mm, disposed at a clearance of 20 mm away from the internal wall surface on the internal wall surface of a drum having a cylinder diameter 585 mm, cylinder length 490 mm, and a capacity of 131.7 L) under the conditions of a packing ratio of 30 volume %, a speed of rotation of 22 rpm and 25° C. While the nonionic surfactant in an amount corresponding to 0.5% and the fragrance were sprayed, the materials were tumbled for 1 minute to surface-modify the materials. Thus, a Cu/binder granulated product III (average particle size 550 μm, volume density 0.86 g/mL) was obtained.

Preparation Examples for Oxidation Catalyst Particles 1 to 11 (Table 3), 2, 4, 9, 11, 12,14 (Table 4)

The components (a) to (c), and if necessary, 500 g of component (f) were charged into a continuous kneader (Model KRS-S1, manufactured by Kurimoto, Ltd.) at the ratios indicated in Table 3 and Table 4. The mixture was kneaded at 65° C., and then was extruded through a multi-hole screen having a hole diameter of 1 mm, and thus a noodle-shaped solid substance was obtained. This solid substance was pulverized using a New Speed Mill (manufactured by Okada Seiko Co., Ltd.), and thereby oxidation catalyst particles were obtained.

The obtained oxidation catalyst particles were sorted, and the particles having a particle size of 300 to 700 µm were used to perform the evaluation described below.

<Preparation of Oxidation Catalyst Particles 1, 3, 5 to 8, 10, 13, 15 to 20 (Table 4)

The component (e) was inputted to a 100 ml beaker so as to have the ratio shown in Table 4 at 100 g in total, and the component (c) was dissolved in a hot bath at 50 degrees Celsius. Subsequently, the component (a), the component (b), and if necessary, other components except a white carbon were added to the dissolved component (c). The mixture was stirred until the mixture was evenly mixed with a glass rod, and the mixture was poured into a 20×25 cm stainless tray as uniformly as possible. Then, a plane solid product was produced after incubating the mixture at room temperature for 12 hours with a plastic wrap thereon.

The solid product was broken up at about 0.5 to 3 cm each, and then crushed with a crusher (manufactured by Tri Blender, TRIO SCIENCE), and chelate/metal/binder granulated products 1, 3, 5 to 8, 10, 13, 15 to 20 were obtained. If necessary, a white carbon was also crushed by the crusher along with the solid product.

The obtained chelete/metal/binder granulated products 1, 3, 5 to 8, 10, 13 and 15 to 18 were sifted out, and particle diameters of 300 to 700 µm were used to test the following.

TABLE 3

|  | Metal (b) | | Chelate agent (a) | | Binder (c) | | Others | |
| --- | --- | --- | --- | --- | --- | --- | --- | --- |
|  | Type | Proportion | Type | Proportion | Type | Proportion | Type | Proportion |
| Granulated product 1 | CuSO$_4$ | 2.5 | HIDS | 35 | PEG6000 | 62.5 | | |
| Granulated product 2 | CuSO$_4$ | 2.5 | IDS | 35 | PEG6000 | 62.5 | | |
| Granulated product 3 | CuSO$_4$ | 2.5 | MGDA | 35 | PEG6000 | 62.5 | | |
| Granulated product 4 | CuSO$_4$ | 10 | HIDS | 20 | PEG6000 | 70 | | |
| Granulated product 5 | CuSO$_4$ | 0.5 | HIDS | 30 | PEG6000 | 69.5 | | |
| Granulated product 6 | CuSO$_4$ | 5 | HIDS | 35 | PEG6000 | 40 | Sodium sulfate | 20 |
| Granulated product 7 | Copper complex L1 | | | 20 | PEG6000 | 80 | | |
| Granulated product 8 | Copper complex L2 | | | 40 | PEG6000 | 60 | | |
| Granulated product 9 | Copper complex L3 | | | 50 | PEG6000 | 50 | | |
| Granulated product 10 | MnCl$_2$ | 2.5 | HIDS | 35 | PEG6000 | 62.5 | | |
| Granulated product 11 | CoCl$_2$ | 2.5 | HIDS | 35 | PEG6000 | 62.5 | | |

TABLE 4

|  | Metal (b) | | Chelate agent (a) | | Binder (c) | | Others | | Discoloration |
| --- | --- | --- | --- | --- | --- | --- | --- | --- | --- |
|  | Type | Proportion | Type | Proportion | Type | Proportion | Type | Proportion | |
| Granulated product 1 | CuSO$_4$ | 2.5 | MGDA | 40 | PEG4000 | 57.5 | | | ○ |
| Granulated product 2 | CuSO$_4$ | 2.5 | MGDA | 40 | PEG6000 | 57.5 | | | ⊚ |
| Granulated product 3 | CuSO$_4$ | 2.5 | MGDA | 40 | EO/PO | 57.5 | | | ⊚ |
| Granulated product 4 | CuSO$_4$ | 2.5 | MGDA | 40 | C16/C18-50 | 57.5 | | | ⊚ |
| Granulated product 5 | CuSO$_4$ | 2.5 | MGDA | 40 | C18-40 | 57.5 | | | ⊚ |
| Granulated product 6 | CuSO$_4$ | 2.5 | MGDA | 40 | C18-30 | 52.5 | White carbon | 5 | ○ |
| Granulated product 7 | CuSO$_4$ | 2.5 | MGDA | 40 | C16/C18-80 | 52.5 | | | ⊚ |
| Granulated product 8 | CuSO$_4$ | 2.5 | MGDA | 40 | hardened caster oil-80 | 52.5 | White carbon | 5 | ⊚ |
| Granulated product 9 | CuSO$_4$ | 2.5 | MGDA | 40 | hardened caster oil-100 | 57.5 | | | ⊚ |
| Granulated product 10 | CuSO$_4$ | 2.5 | IDS | 40 | PEG6000 | 57.5 | | | ⊚ |
| Granulated product 11 | CuSO$_4$ | 2.5 | HIDS | 40 | PEG4000 | 57.5 | | | ○ |
| Granulated product 12 | CuSO$_4$ | 2.5 | HIDS | 40 | PEG6000 | 57.5 | | | ⊚ |
| Granulated product 13 | MnCl$_2$ | 5 | MGDA | 40 | PEG6000 | 55 | | | ○ |
| Granulated product 14 | Copper Complex L2 | | | 42.5 | PEG4000 | 57.5 | | | ○ |
| Granulated product 15 (Comparative article) | CuSO$_4$ | 2.5 | — | — | PEG6000 | 57.5 | Sodium sulfate | 40 | X |
| Granulated product 16 (Comparative article) | CuSO$_4$ | 2.5 | MGDA | 40 | — | — | Palmitic acid | 57.5 | Δ |
| Granulated product 17 (Comparative article) | CuSO$_4$ | 2.5 | MGDA | 40 | PEG1540 | 57.5 | | | X |
| Granulated product 18 (Comparative article) | CuSO$_4$ | 2.5 | MGDA | 40 | C18-20 | 52.5 | White carbon | 5 | X |
| Granulated product 19 (Comparative article) | CuSO$_4$ | 2.5 | MGDA | 40 | C22-30 | 52.5 | White carbon | 5 | X |
| Granulated product 20 (Comparative article) | CuSO$_4$ | 2.5 | EDTA | 40 | PEG6000 | 52.5 | | | ⊚ |

The abbreviated components in the tables are as follows.
<Component (a)>
HIDS: 3-hydroxy-2,2'-iminodisuccinic acid 4 sodium salt (manufactured by Nippon Shokubai Co., Ltd.)
IDS: 2,2'-iminodisuccic acid 4 sodium salt (manufactured by LANXESS)
MGDA: Methylglycine 3 sodium salt (manufactured by BASF)

In addition, the following chelate agent was used as a Comparative Example.
EDTA: Ethylenediamine tetra acetic acid sodium (manufactured by Kanto Chemical Co., Inc.)
<Component (b)>
$CuSO_4$: Copper (II) sulfate pentahydrate (manufactured by Kanto Chemical Co., Inc.)
$MnCl_2$: Manganese (II) chloride tetrahydrate (manufactured by Kanto Chemical Co., Inc.)

Furthermore, the following cobalt compound was used in the Comparative Examples.
$CoCl_2$: Cobalt (II) chloride, (manufactured by Yoneyama Yakuhin Kogyo Co., Ltd.)
<Component (b)>
PEG6000: Polyethylene glycol #6000M (manufactured by Lion Corporation)
PEG4000: Polyethylene glycol #4000 (manufactured by Lion Corporation)
EO/PO: GENAPOL PP 80 POWDER (manufactured by Clariant Japan)
C16/18-50: Lutensol AT50POWER (manufactured by BASE Japan)
C16/18-80: Lutensol AT80POWER (manufactured by BASE Japan)
C18-40: EMALEX640(manufactured by Nihon-Emulsion Co., Ltd.)
C18-30: EMALEX630(manufactured by Nihon-Emulsion Co., Ltd.)
Hardened caster oil-80: EMALEX HC-80 (manufactured by Nihon-Emulsion Co., Ltd.)
Hardened caster oil-100: EMALEX HC-100 (manufactured by Nihon-Emulsion Co., Ltd.)

Furthermore, the following binder compositions were used in the Comparative Examples.
PEG1540: Polyethylene glycol #1540 (manufactured by Lion Corporation)
C18-20: EMALEX620 (manufactured by Nihon-Emulsion Co., Ltd.)
C22-30: EMALEX BHA-30 (manufactured by Nihon-Emulsion Co., Ltd.)
<Other Components>
White carbon: TOKUSIL® N (manufactured by Tokuyama Corp.)
Palmitic acid: Palmitic acid Special grade chemicals ((manufactured by Kanto Chemical Co., Inc.), melting point: 60-63 degrees Celsius)
Sodium sulfate: Neutral anhydrous sodium sulfate (manufactured by Shikoku Chemicals Corporation)

Subsequently, surfactant-containing particles, surface-treated inorganic particles and bleach activating agent particles were prepared. Powder forms of sodium percarbonate, chelate/metal/binder granulated product, sodium carbonate and enzymes were uniformly mixed, and the bleaching composition represented in Table 5 and Table 6 was prepared. Furthermore, Table 5 is the results obtained from the particles of Table 3, and Table 6 is the results obtained from the particles of Table 4.

TABLE 5

| | | Examples | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Peroxide | Percarbonate 1 | 6 | 6 | 6 | 6 | 6 | 6 | 6 | 6 | 6 | 6 | 6 | 6 | 6 | 6 | | 10 | 6 |
| | Percarbonate 2 | | | | | | | | | | | | | | | 6 | | |
| | Percarbonate 3 | | | | | | | | | | | | | | | | | |
| Chelate agent | HIDS | 0.4 | 0.4 | 0.4 | | | | | | | | | | | | | | |
| | IDS | | | | 0.4 | | | | | | | | | | | | | |
| | MGDA | | | | | 0.4 | | | | | | | | | | | | |
| | EDTA | | | | | | | | | | | | | | | | | |
| Metal (Cu) | $CuSO_4$ | | | | | | | | | | | | | | | | | |
| Binder compound | PEG8000 | | | | | | | | | | | | | | | | | |
| Metal(Co)/ Binder granulated product | I | 1 | | | 1 | 1 | | | | | | | | | | | | |
| | II | | 0.5 | | | | | | | | | | | | | | | |
| | III | | | 82.4 | | | | | | | | | | | | | | |
| Chelate/ Metal/ Binder granulated product | 1 | | | | | | | 1 | | | | | | | | 1 | 1 | 2 |
| | 2 | | | | | | 1 | | | | | | | | | | | |
| | 3 | | | | | | | | 1 | | | | | | | | | |
| | 4 | | | | | | | | | 0.5 | | | | | | | | |
| | 5 | | | | | | | | | | 5 | | | | | | | |
| | 6 | | | | | | | | | | | 1 | | | | | | |
| | 7 | | | | | | | | | | | | 1.5 | | | | | |
| | 8 | | | | | | | | | | | | | 1 | | | | |
| | 9 | | | | | | | | | | | | | | 1 | | | |
| | 10 (Comparative article) | | | | | | | | | | | | | | | | | |
| | 11 (Comparative article) | | | | | | | | | | | | | | | | | |

TABLE 5-continued

| | | | | | | | | | | | | | | | | | | |
|---|---|---|---|---|---|---|---|---|---|---|---|---|---|---|---|---|---|---|
| Activating agent | OBS | | | | | | | | | | | | | | | | | |
| | OBC | | | | | | | | | | | | | | | | | |
| Surfactant-containing particles | | 81.4 | 81.9 | — | 81.4 | 81.4 | 81.8 | 81.8 | 81.8 | 82.3 | 77.8 | 81.8 | 81.3 | 81.8 | 83.8 | 81.8 | 77.8 | 80.8 |
| Sodium carbonate | | | | | | | | | | | | | | | | | | |
| Builder particles | | 10 | 10 | 10 | 10 | 10 | 10 | 10 | 10 | 10 | 10 | 10 | 10 | 10 | 10 | 10 | 10 | 10 |
| Enzyme | | 1 | 1 | 1 | 1 | 1 | 1 | 1 | 1 | 1 | 1 | 1 | 1 | 1 | 1 | 1 | 1 | 1 |
| Fragrance | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Sterilizing effect | Colon bacillus | ◎ | ◎ | ◎ | ◎ | ◎ | ◎ | ◎ | ◎ | ◎ | ○ | ◎ | ◎ | ◎ | ○ | ◎ | ◎ | ◎ |
| | Staphylococcus aureus | △ | △ | △ | △ | △ | △ | △ | △ | △ | △ | △ | △ | △ | △ | △ | △ | △ |
| Peroxide stability | | ○ | △ | ◎ | ○ | ○ | ◎ | ◎ | ◎ | ○ | ○ | ◎ | ◎ | ◎ | ○ | ◎ | ◎ | ◎ |

| | | | Examples | | | | | | Comparative Examples | | | | | | | | |
|---|---|---|---|---|---|---|---|---|---|---|---|---|---|---|---|---|---|
| | | | 18 | 19 | 20 | 21 | 22 | 23 | 1 | 2 | 3 | 4 | 5 | 6 | 7 | 8 | 9 |
| Peroxide | Percarbonate 1 | | 6 | 6 | 6 | 4 | 6 | | 6 | 6 | 6 | 6 | 6 | 6 | 6 | 6 | 6 |
| | Percarbonate 2 | | | | | | | | | | | | | | | | |
| | Percarbonate 3 | | | | | | | 50 | | | | | | | | | |
| Chelate agent | HIDS | | | | | | | | | 0.4 | 0.4 | 0.4 | 0.4 | | | | |
| | IDS | | | | | | | | | | | | | | | | |
| | MGDA | | | | | | | | | | | | | | | | |
| | EDTA | | | | | | | | | | | | | | | | 0.4 |
| Metal (Cu) | CuSO$_4$ | | | | | | | | | 0.1 | | 0.1 | | | | | |
| Binder compound | PEG8000 | | | | | | | | | | 0.5 | 0.5 | | | | | |
| Metal(Co)/Binder granulated product | I | | | | | | | | 1 | | | 1 | | | 1 | 1 | |
| | II | | | | | | | | | | | | | | | | |
| | III | | | | | | | | | | | | | | | | |
| Chelate/Metal/Binder granulated product | 1 | | 1 | 1 | | 1 | 4 | 2 | | | | | | | | | |
| | 2 | | | | | | | | | | | | | | | | |
| | 3 | | | | | | | | | | | | | | | | |
| | 4 | | | | 1 | | | | | | | | | | | | |
| | 5 | | | | | | | | | | | | | | | | |
| | 6 | | | | | | | | | | | | | | | | |
| | 7 | | | | | | | | | | | | | | | | |
| | 8 | | | | | | | | | | | | | | | | |
| | 9 | | | | | | | | | | | | | | | | |
| | 10 (Comparative article) | | | | | | | | | | | | | 1 | | | |
| | 11 (Comparative article) | | | | | | | | | | | | | | | 1 | |
| Activating agent | OBS | | 0.5 | | | 1 | 1 | 1 | | | | | | | | 1 | |
| | OBC | | | 0.5 | 0.5 | | | | | | | | | | | | |
| Surfactant-containing particles | | | 81.3 | 81.3 | 81.3 | 80.8 | 77.6 | | 87.4 | 82.3 | 81.9 | 81.8 | 81.8 | 81.8 | 81.8 | 80.8 | 81.4 |
| Sodium carbonate | | | | | | | | 41.8 | | | | | | | | | |
| Builder particles | | | 10 | 10 | 10 | 10 | 10 | | 10 | 10 | 10 | 10 | 10 | 10 | 10 | 10 | 10 |
| Enzyme | | | 1 | 1 | 1 | 1 | 1 | 1 | 1 | 1 | 1 | 1 | 1 | 1 | 1 | 1 | 1 |
| Fragrance | | | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Sterilizing effect | Colon bacillus | | ◎ | ◎ | ◎ | ◎ | ◎ | ◎ | X | ◎ | X | ◎ | △ | X | X | △ | X |
| | Staphylococcus aureus | | ◎ | ◎ | ○ | ◎ | ○ | ◎ | X | △ | X | △ | △ | X | X | △ | X |
| Peroxide stability | | | ◎ | ◎ | ○ | ◎ | ○ | ◎ | — | X | ◎ | X | ○ | ○ | ○ | ○ | ○ |

TABLE 6

| | | Example | | | | | | | | | | | | | | | | | | Comparative Example | | | | | |
|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 1 | 2 | 3 | 4 | 5 | 6 |
| Peroxide | Percarbonate 1 | 6 | 6 | 6 | 6 | 6 | 6 | 6 | 6 | 6 | 6 | 6 | 6 | 6 | 6 | 10 | 6 | 45 | | 6 | 6 | 6 | 6 | 6 | 6 |
| | Percarbonate 2 | | | | | | | | | | | | | | | | 6 | | | | | | | | |
| | Percarbonate 3 | | | | | | | | | | | | | | | | | | | | | | | | |
| Chelate/ Metal/ Binder granulated product | 1 | 1 | | | | | | | | | | | | | | | | | | | | | | | |
| | 2 | | 1 | | | | | | | | | | | | | 1 | 2 | 0.5 | 3 | | | | | | |
| | 3 | | | 1 | | | | | | | | | | | | | | | | | | | | | |
| | 4 | | | | 1 | | | | | | | | | | | | | | | | | | | | |
| | 5 | | | | | 1 | | | | | | | | | | | | | | | | | | | |
| | 6 | | | | | | 1 | | | | | | | | | | | | | | | | | | |
| | 7 | | | | | | | 1 | | | | | | | | | | | | | | | | | |
| | 8 | | | | | | | | 1 | | | | | | | | | | | | | | | | |
| | 9 | | | | | | | | | 1 | | | | | | | | | | | | | | | |
| | 10 | | | | | | | | | | 1 | | | | | | | | | | | | | | |
| | 11 | | | | | | | | | | | 1 | | | | | | | | | | | | | |
| | 12 | | | | | | | | | | | | 1 | | | | | | | | | | | | |
| | 13 | | | | | | | | | | | | | 1 | | | | | | | | | | | |
| | 14 | | | | | | | | | | | | | | 1 | | | | | | | | | | |
| | 15 (Comparative article) | | | | | | | | | | | | | | | | | | | 1 | | | | | |
| | 16 (Comparative article) | | | | | | | | | | | | | | | | | | | | 1 | | | | |
| | 17 (Comparative article) | | | | | | | | | | | | | | | | | | | | | 1 | | | |
| | 18 (Comparative article) | | | | | | | | | | | | | | | | | | | | | | 1 | | |
| | 19 (Comparative article) | | | | | | | | | | | | | | | | | | | | | | | 1 | |
| | 20 (Comparative article) | | | | | | | | | | | | | | | | | | | | | | | | 1 |
| Bleach activating agent | OBS | 1 | 1 | 1 | 1 | 1 | 1 | 1 | 1 | 1 | 1 | 1 | 1 | 1 | 1 | | 1 | 5 | | | | | | | |
| | OBC | | | | | | | | | | | | | | | 1 | | | | | | | | | | |
| Surfactant-containing particles | | 81 | 81 | 81 | 81 | 81 | 81 | 81 | 81 | 81 | 81 | 81 | 81 | 81 | 81 | 81 | 76 | 81.5 | 10 | 82 | 82 | 82 | 82 | 82 | 82 |
| Sodium carbonate | | | | | | | | | | | | | | | | | | | 35.8 | | | | | | |
| Surface-treated inorganic particles | | 10 | 10 | 10 | 10 | 10 | 10 | 10 | 10 | 10 | 10 | 10 | 10 | 10 | 10 | 10 | 10 | 10 | | 10 | 10 | 10 | 10 | 10 | 10 |
| Enzyme | | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Bleaching effect (curcumin) | | ◎ | ◎ | ◎ | ◎ | ◎ | ◎ | ◎ | ◎ | ◎ | ◎ | ○ | ○ | ○ | ◎ | ◎ | ◎ | ○ | ◎ | Δ | Δ | ◎ | ◎ | ◎ | Δ |
| Discoloration of granulated product | | ○ | ◎ | ◎ | ◎ | ◎ | ○ | ◎ | ◎ | ○ | ◎ | ○ | ◎ | ○ | ○ | ◎ | ◎ | ◎ | ◎ | X | X | X | X | X | ◎ |
| Solubility | | ○ | ○ | ○ | ○ | ○ | ○ | ○ | ○ | ○ | ○ | ○ | ○ | ○ | ○ | ○ | ○ | ○ | ○ | ○ | X | ○ | ○ | ○ | ○ |

"Preparation of Surfactant-containing Particles"

Particles containing a surfactant (surfactant-containing particles) were prepared by the following procedure according to the composition indicated in Table 7.

TABLE 7

| Component of surfactant-containing particles | Amount of incorporation |
|---|---|
| MES | 11 |
| LAS-Na | 0.7 |
| LAS-K | 0.3 |
| Soap | 4 |
| Nonionic surfactant | 4 |
| A-type Zeolite | 15 |
| Sodium carbonate | Balance |
| Potassium carbonate | 5 |
| Fluorescent whitening agent | 0.1 |
| Polymer A | 2 |
| Sodium sulfate | 13 |

TABLE 7-continued

| Component of surfactant-containing particles | Amount of incorporation |
|---|---|
| Fragrance | 0.2 |
| Moisture | 7 |

First, water was placed in a jacketed mixing tank equipped with a stirring device, and the temperature was adjusted to 60° C. All remaining surfactants excluding MES and the nonionic surfactant, were added thereto, and the mixture was stirred for 10 minutes. Subsequently, sodium salt of an acrylic acid/maleic acid copolymer (Polymer A) was added, and the mixture was stirred for a further 10 minutes. Then, a portion of powdered A-type Zeolite (excluding A-type Zeolite for addition upon kneading in an amount corresponding to 7.0% (relative to each particle group, the same hereinafter), A-type Zeolite for pulverization preparation in an amount corresponding to 3.2%, and A-type Zeolite for surface coating in an amount corresponding to 2.0%), sodium carbonate, potassium carbonate, sodium chloride and sodium sulfate were added thereto. Furthermore, the mixture was stirred for 20 minutes to prepare a slurry for spray drying having 38% moisture, and then the slurry was spray dried under the conditions of a hot air temperature of 280° C. using a countercurrent type spray drying column. Thus, spray-dried particles having an average particle size of 290 μm, a volume density of 0.32 g/mL and 5% moisture were obtained.

"Method for Measuring Average Particle Size"

First, a sorting operation was carried out for the object of measurement (sample) using sieves piled in 9 layers, each having a mesh size of 1,680 μm, 1,410 μm, 1,190 μm, 1,000 μm, 710 μm, 500 μm, 350 μm, 250 μm or 149 μm, and a receiving pan. The sorting operation was conducted with the receiving pan on bottom, piling up 9 layers from the smallest-mesh sieve to the largest-mesh sieve on top and 100 g/time of the sample was placed on the 1,680 μm-mesh sieve on top with its cover on, which was attached to Ro-Tap Sieve Shaker (manufactured by Iida Seisakusho Co., Ltd., tapping: 156 times/min, rolling: 290 times/min). It was shaken for 10 minutes, and then the sample remaining in the sieves and the receiving pan was collected from each sieve and the mass of the sample was measured.

As the mass-frequency of the sample remaining on the receiving pan and the sieves was added up, and, the mesh size of that first sieve giving an added mass-frequency of 50% or more was designated as "a μm", the mesh size one size larger than "a μm" was designated as "b μm", the added sum of the mass-frequency added from the sample remaining on the receiving pan to the sample remaining in the sieve with a mesh size of "a μm" was designated as "c %", and the mass-frequency of the sample on the sieve with a mesh size of "a μm" was designated as "d %". The average particle size (mass 50%) was determined by the above expression (1).

On the other hand, a portion of the nonionic surfactant (25% relative to MES) was added to the aqueous slurry (moisture concentration 25%) of MES, and the mixture was concentrated under reduced pressure using a thin film type dryer until the moisture content reached 11%. Thus, a mixed concentrate of MES and the nonionic surfactant was obtained.

The dried particles mentioned above, this mixed concentrate, A-type Zeolite in an amount corresponding to 7.0%, the remaining nonionic surfactant excluding the surfactant for spray addition in an amount corresponding to 0.5%, the fluorescent whitening agent and water were charged into a continuous kneader (Model RC-S4, manufactured by Kurimoto, Ltd.), and the mixture was kneaded under the conditions of a kneading ability of 120 kg/h and a temperature of 60° C., to obtain a surfactant-containing kneaded product. This surfactant-containing kneaded product was cut with a cutter (circumferential speed of cutter 5 m/s) while being extruded using a pelleter double (Model EXDFJS-100, manufactured by Fuji Paudal Co, Ltd,) equipped with a die having a hole diameter of 10 mm, to obtain a pellet-shaped surfactant-containing molded product having a length of about 5 to 30 mm.

Subsequently, A-type Zeolite as a pulverization aid was added in an amount corresponding to 3.2% to the obtained pellet-shaped surfactant-containing molded product, and the mixture was pulverized using a Fitmill (DKA-3, manufactured by Hosokawa Micron Corp.) arranged in 3 stages in series, (screen hole diameter: first stage/second stage/third stage=12 mm/6 mm/3 mm, speed of rotation: 4,700 rpm for all of first stage/second stage/third stage), in the co-presence of cool wind (10° C., 15 m/s). Finally, A-type Zeolite in an amount corresponding to 2.0% was added to a horizontal cylindrical tumbling mixer (a mixer having two baffles having a height of 45 mm high and clearance of 20 mm, disposed at a clearance of 20 mm away from the internal wall surface on the internal wall surface of a drum having a cylinder diameter of 585 mm, a cylinder length of 490 mm, and a capacity of 131.7 L) under the conditions of a packing ratio of 30 volume %, a speed of rotation of 22 rpm and 25° C. While the nonionic surfactant in an amount corresponding to 1.0% and the fragrance were sprayed, the materials were tumbled for 1 minute to surface-modify the materials. Thus, surfactant—containing particles (average particle size 550 μm, volume density 0.86 g/mL) was obtained.

The abbreviated components in the tables are as follows.
(Surfactant)
MES: A sodium salt of fatty acid methyl ester sulfonate of carbon number 16:carbon number 18=80:20 (manufactured by Lion Corp., AI=70%, the balance includes unreacted fatty acid methyl ester, sodium sulfate, methyl sulfate, hydrogen peroxide, water and the like)
LAS-K: Linear alkyl (carbon number 10 to 14) benzenesulfonate (Lipon LH-200 (pure fraction of LAS-H 96%) manufactured by Lion Corp. is neutralized with a 48% aqueous solution of potassium hydroxide at the time of preparing the surfactant composition). The amount of incorporation in Table 7 indicates mass % in terms of LAS-K.
LAS-Na: Linear alkyl (carbon number 10 to 14) benzenesulfonate (Lipon LH-200 (pure fraction of LAS-U 96%) manufactured by Lion Corp. is neutralized with a 48% aqueous solution of potassium hydroxide at the time of preparing the surfactant composition). The amount of incorporation in Table 7 indicates mass % in terms of LAS-Na.
Soap: Sodium fatty acid having 12 to 18 carbon atoms (manufactured by Lion Corp., pure fraction: 67%, titer: 40 to 45° C., fatty acid composition: C12: 11.7%, C14: 0.4%, C16: 29.2%, C18F0 (stearic acid): 0.7%, C18F1 (oleic acid): 56.8%, C18F2 (linolic acid): 1.2%, molecular weight: 289)
Nonionic surfactant: Adduct of ECOROL 26 (alcohol having an alkyl group having 12 to 16 carbon atoms, manufactured by Ecogreen GmbH) with an average of 15 moles of ethylene oxide
PEG6000: Polyethylene glycol manufactured by Lion Corp., trade name: PEG #6000M (average molecular weight 7300 to 9300)

(Fluorescent Whitening Agent)
Fluorescent whitening agent: Tinopal CBS-X (manufactured by Ciba Specialty Chemicals, Inc.)
(Builder)
Sodium sulfate: Neutral anhydrous sodium sulfate (manufactured by Shikoku Chemical Corp.)
Potassium carbonate: potassium carbonate (manufactured by Asahi Glass Co., Ltd.)
A-type Zeolite: A-type Zeolite (manufactured by Mizusawa Industrial Chemicals, Ltd.)
Polymer A: Sodium salt of acrylic acid/maleic acid copolymer, manufactured by BASF, trade name: Sokalan CP7
(Fragrance)
Fragrance: Fragrance composition B indicated in [Table 11] to [Table 18] of JP-A No. 2002-146399
(Percarbonate)
Percarbonate 1: Coated sodium percarbonate coated with silicic acid and sodium borate (trade name; SPC-D, manufactured by Mitsubishi Gas Chemical Company, Inc., effective oxygen amount 13.2%, average particle size 760 μm)
Percarbonate 2: trade name: SPCC, manufactured by Zhejiang Jinke Chemicals Co., Ltd., effective oxygen amount 118%, average particle size 870 μm
Percarbonate 3; trade name: SPC-Z, manufactured by Mitsubishi Gas Chemical Company, Inc., effective oxygen amount: 10.9%, (product blended at a ratio of sodium percarbonate/sodium carbonate/sodium hydrogen carbonate=77/3/20 for eliminate danger)
(Enzyme)
Enzyme: Mixture of Everlase ST (manufactured by Novozymes, Inc.)/Lipex 50T (manufactured by Novozymes, Inc.)/Termamil 60T (manufactured by Novozymes, Inc.)/Cellzyme 0.7T (manufactured by Novozymes,. Inc.)=5/2/1/2 (mass ratio)

"Preparation of Surface-treated Inorganic Particles"

Surface-treated inorganic alkali agent particles formed from 85 mass % of sodium carbonate, 3 mass % of MA/AA agent, 7 mass % of lauric acid, and water for the balance, were prepared by the following process.

For the MA/AA agent, a sodium salt of an acrylic acid/maleic anhydride copolymer (trade name: Aquatic TL-400, manufactured by Nippon Shokubai Co., Ltd., pure fraction 40 mass % aqueous solution) was used, and for the lauric acid, trade name: NAA-122 (melting point 43° C.) manufactured by Nippon Oil & Fats Co., Ltd. was used.

(First Process)

Sodium carbonate was charged into a Proshear mixer (manufactured by Taiheiyou Kikou Co., Ltd.) equipped with a spade blade-shaped shovel and having a clearance between the shovel and the wall of 5 mm (packing ratio 30 volume %), and stirring was initiated at 150 rpm about the main axis (number of chopper rotations: 1015 rpm, blade tip speed (circumferential speed): 6.9 m/s). After 10 seconds from the initiation of stirring, the MA/AA agent was added by spraying for 180 seconds through a pressurizing nozzle (flat nozzle) at a spraying angle of 115°, and thus a granulation and coating operation was carried out. Thus, the particles were produced.

Furthermore, when the amount of moisture exceeded 10 mass % in the total amount of particles prepared by this first process, hot air was introduced into the apparatus to dry the particles, and thereby the moisture amount of the entire particles was adjusted to 10 mass % or less.

(Second Process)

Subsequently, while stirring was continued with the Proshear mixer, lauric acid was added by spraying for 180 seconds through a pressurizing nozzle (full con nozzle) at a spraying angle of 60°, and thereby the coating operation was carried out. Stirring was continued for 30 seconds, and particles were obtained.

(Third Process)

Subsequently, the particles obtained by the second process were filled in a fluid bed (Glatt-POWREX, product No. FDWRT-20, manufactured by Powrex Corp.), and after filling, wind (air) at 15° C. was blown into the fluid bed to carry out a cooling operation of the particles. Thus, particles cooled down to 20° C. were obtained. The air speed in the fluid bed was adjusted in the range of 0.2 to 10.0 m/s while checking the fluidized state. The obtained particles were sorted using a sieve having a mesh size of 2000 and the group of particles which passed through the sieve having a mesh size of 2000 μm was obtained as surface-treated inorganic particles.

"Preparation of Bleach Activating Agent Particles (OBS)"

First, sodium 4-dodecanoyloxybenzenesulfonate was synthesized as a bleach activating agent. Sodium p-phenolsulfonate (reagent manufactured by Kanto Chemical Co., Ltd.), N,N-dimethylformamide (reagent manufactured by Kanto Chemical Co., Ltd.), lauric acid chloride (reagent manufactured by Tokyo Chemical Industries, Ltd.), and acetone (reagent manufactured by Kanto Chemical Co., Ltd.) were used as raw materials, and synthesis was carried out by the following method, 100 g (0.51 mol) of sodium p-phenolsulfonate which had been dehydration treated in advance, was dispersed in 300 g of dimethylformamide, and while stirring the system with a magnetic stirrer, 111 g (0.51 mol) of lauric acid chloride was added dropwise over 30 minutes at 50° C. After completion of the dropwise addition, the reaction was carried out for 3 hours, and dimethylformamide was distilled off under reduced pressure (0.5 to 1 mmHg) at 100° C. The residue was washed with acetone, and was recrystallized from a solvent of water/acetone (=1/1 mol). The yield was 90%.

70 parts by mass of sodium 4-dodecanoyloxybenzenesulfonate thus obtained, 20 parts by mass of PEG [polyethylene glycol #6000M (manufactured by Lion Corp.)], and 5 parts by mass of a powder product of sodium α-olefinsulfonate having 14 carbon atoms (Lipolan PJ-400 (manufactured by Lion Corp.)) were fed to Extrud-O-Mix Model EM-6 manufactured by Hosokawa Micron Corp., and the mixture was kneaded and extruded (kneading temperature 60° C.). Thereby, a noodle-shaped extrusion product having a diameter of 0.8 mm φ was obtained. This extrusion product (cooled to 20° C. by cool air) was charged into Fitmill Model DKA-3 manufactured by Hosokawa Micron Corp., and 5 parts by mass of A-type Zeolite powder was supplied together as an auxiliary agent. The mixture was pulverized, and thus bleach activating agent particles (OBS) having an average particle size of about 700 μm were obtained.

"Preparation of Bleach Activating Agent Particles (OBC)"

70 parts by mass of 4-decanoyloxybenzoic acid (manufactured by Mitsui Chemicals, Inc.) as a bleach activating agent, 20 parts by mass of PEG [polyethylene glycol #6000M (manufactured by Lion Corp.)], and 5 parts by mass of a powder product of sodium α-olefinsulfonate having 14 carbon atoms (Lipolan PJ-400 (manufactured by Lion Corp.)) were fed to Extrud-O-Mix Model EM-6 manufactured by Hosokawa. Micron Corp., and the mixture was kneaded and extruded (kneading temperature 60° C.). Thereby, a noodle-shaped extrusion product having a diameter of 0.8 mm φ was obtained. This extrusion product (cooled to 20° C. by cool air) was charged into Fitmill Model DKA-3 manufactured by Hosokawa Micron Corp., and 5 parts by mass of A-type Zeolite powder was supplied together as an auxiliary agent.

The mixture was pulverized, and thus bleach activating agent particles (OBC) having an average particle size of about 700 μm were obtained.

"Evaluation of Sterilizing Power"

9.9 mL of a liquid-state test liquid having a sterilizing agent composition at a concentration of 0.07 mass % was prepared. 0.1 mL of a colon bacillus (IFO3972) which had been adjusted to have a bacterial cell count of 108 cells/mL was added to the test liquid, and the mixture was stirred uniformly. After 10 minutes, 1 mL of the test liquid was collected and added to 9 mL of SCDLP medium (Soybean-Casein Digest Broth with Lectin & Polysorbate 80: manufactured by Wako Pure Chemical Industry Co., Ltd.) to obtain a 10-fold dilution. The obtained dilution was subjected to an operation of further diluting to 10-fold repeatedly for 4 times, and thus a dilution series from 10-fold to 100000-fold was obtained. From each of these dilutions, 1.0 mL was collected onto a petri dish, and 15 mL of SCDLP agar medium (Soybean-Casein Digest Ager with Lectin & Polysorbate 80: manufactured by Wake Pure Chemical Industry Co., Ltd.) was added thereto with homogenization. The mixture was cultured for 2 days at 37° C., and then those having a colony count in the range of 70 to 300 were selected. The colonies were counted, and the number of live cells was determined. The difference between the logarithmic value of the first bacterial count and the logarithmic value of the number of live cells after the test, was defined as the number of eliminated bacteria.

(Evaluation Criteria for Sterilizing Power)

The sterilizing power was evaluated based on the following four grades, as compared with the case of not incorporating the sterilizing agent composition (K).

X: Number of eliminated bacteria less than a one-digit number

Δ: Number of eliminated bacteria less than a two-digit number

◯: Number of eliminated bacteria equal to or more than a two-digit number and less than a three-digit number ◎: Number of eliminated bacteria equal to or more than a three-digit number The results are presented in Tables 6, 9, 10 and 11.

"Hydrogen Peroxide Stability Evaluation 1"

A hydrogen peroxide stability test was carried out on the sterilizing agent composition by the following method. 100 g of the sterilizing agent composition was placed in a container (a box-shaped container having a size of three edges of 155 mm, 95 mm and 145 mm in length, made of three layers of paper including a coated cardboard paper (basis weight: 350 g/m$^2$), a wax sandpaper (basis weight: 30 g/m$^2$) and a craft paper (basis weight: 70 g/m$^2$) from the outer side (moisture permeability 25 g/m$^2$·24 hours (40° C., 90% RH)). The sterilizing agent was stored, for 2 weeks under recycle conditions of 45° C. and 25° C. (45° C.: humidity 85% 16 h, 25° C.: humidity 65%, 8 h), and then the stability evaluation of hydrogen peroxide (sodium percarbonate) was carried out by an iodometry method.

(Hydrogen Peroxide Stability Evaluation Criteria)

The hydrogen peroxide stability was evaluated by the following five grades from the values of the residual ratio of sodium percarbonate.

5 points: More than 90%
4 points: More than 80% to equal to or less than 90%
3 points: More than 70% to equal to or less than 80%
2 points: More than 60% to equal to or less than 70%
1 point: More than 40% to equal to or less than 60%
0 point: 0% to equal to or less than 40%

The results are presented in Tables 8 to 10, 12 to 14.

<Summary of Results of Table 3 and Table 5>

From the results given above, in Examples 1 to 23, evaluation results of high sterilizing effect and high peroxide stability were obtained. Furthermore, in Examples 1 to 3, since the amount of copper contained in the granulated product was different, even though the contents of other components were all the same, differences in the peroxide stability could be seen. This is because a large amount of copper obstructs the stability of peroxide.

As compared with Example 1, 4 and 5, Example 6, 7 and 8 had enhanced stability of peroxide because the chelate agent and copper were present in the same particles.

In Example 9, the content of copper in the granulated product was high, and the frequency of contact between copper and peroxide increases. Thus, there was a tendency to decrease in the stability of peroxide.

In Example 10, since the ratio of chelate agent/copper is high, and the effect is decreased even if the ratio is too high, the sterilizing effects tended to decrease. Furthermore, since the amount of incorporation of the granulated product is large and causes an increase in the frequency of contact between copper and peroxide, stability of peroxide tended to decrease.

In Example 11, the same extent of effect was exhibited even if an inorganic substance (sodium sulfate) was contained in the granulated product.

In Examples 12 and 13, the same extent of effect was exhibited even if a complex was formed.

In Example 14, the effect tends to decrease when dipicolinic acid was used as a chelating reagent.

In Examples 15 to 17, the same extent of effect was exhibited even if the type or amount of the peroxide and the amount of the granulated product were changed.

In Examples 18 to 23, since a bleach activating agent was contained, high sterilizing effects were obtained against *Staphylococcus aureus*.

In Example 20, the stability of peroxide decreased because low ratio of chelate agent/copper caused frequent contact of copper and peroxide. In addition, increment of the existence of copper which did not form the complex in the laundry solution and neutralization of an active agent by active oxygen caused an adverse influence to the active agent.

In Example 22, the stability of hydrogen peroxide tended to decrease because too much particle content caused frequent contact of copper and superoxide. In addition, increment of the existence of copper which did not form the complex in the laundry solution and neutralization of an active agent by active oxygen caused an adverse influence to the active agent.

On the contrary, since Comparative Example 1 did not contain any peroxide, the sterilizing effect was absent. Since Comparative Example 2 did not contain any binder compound, the peroxide stability was low. Comparative Example 3 did not contain copper, the stability of peroxide was good. Comparative Example 4 was not granulated, and thus the peroxide stability was low. Since Comparative Example 5 had copper added in a state of being granulated with a binder, stability was relatively good, but the sterilizing effect was low due to the absence of the chelate agent of the invention.

Comparative Examples 6 and 7 utilized granulated products respectively containing manganese and cobalt instead of copper, and thus the sterilizing effect was not obtained. Furthermore, Comparative Example 8 did not contain any chelate agent, and thus the sterilizing effect was low. In addition, the sterilizing effect was not obtained because the chelate agent having coordination position 6 was used in Comparative Example 9.

"Evaluation of Bleaching Power Against Curcumin-stained Cloth"

(Preparation of Curcumin-stained Cloth)

Five sheets of oiled cloth (purchased from Laundry Science Association), each having a size of 25×30 cm, were immersed in an aqueous solution of 0.002% curcumin (manufactured by MERCK-Schuchardt OHG)/sodium carbonate for 20 minutes. The cloth pieces were taken out and rinsed under flowing tap water for 2 minutes. The cloth pieces were dehydrated, dried in air, and cut into specimens having a size of 2×2 cm to be supplied to the experiment.

(Bleaching Test of Curcumin-stained Cloth)

2 g of the bleaching agent composition was added to 198 g of tap water at 25° C. and was dissolved for 2 minutes (stirred at 100 rpm using a 200-ml beaker and a stirrer 3 cm in length) to prepare a test liquid. This liquid was applied on three sheets of the stained cloth obtained as described above for 30 minutes. Thereafter, the cloth pieces were rinsed for 3 minutes with ion-exchanged water, dehydrated for 1 minute, and dried in air for 12 hours at 25° C.

The reflectance of the original cloth and the stained cloth before and after washing was measured using NDR-101DP manufactured by Nippon Denshoku Industries Co., Ltd. and a 460-nm filter, and the washing bleaching power was determined by the following expression (2). Thereby, an evaluation of the bleaching power was carried out. The bleaching power was obtained by determining the average value of the bleaching power on 5 sheets of stained cloth, and was evaluated based on the 3-grade evaluation criteria shown below.

[Expression 2]

Bleaching power (%)=[Reflectance after bleaching treatment−Reflectance before bleaching treatment]/[Reflectance of original cloth−Reflectance before bleaching treatment]×100     (2)

(Evaluation Criteria for Curcumin Bleaching Power)

Δ: Bleaching power is lower compared to Comparative Example 1, or less than +5%

◯: Bleaching power is higher compared to Comparative Example 1, and equal to or greater than +5% and less than 10%

◎Bleaching power is markedly higher compared to Comparative Example 1, and +10% or greater The results are shown in Table 6.

"Test on Discoloration of Granulated Product"

A test on discoloration of the granulated product (maintenance of product appearance) was performed by the following method for the bleaching composition.

In a glass vessel (SV-50A, manufactured by Nichiden-Rika Glass Co., Ltd.), 10 g of the bleaching composition of Table 6 was placed, and while the cap was half-open, the bleaching composition was stored for 10 days under recycle conditions of 45° C. and 25° C. (45° C.: humidity of 85% 16 h, 25° C.: humidity of 65% 8 h). Then, the externa appearance of each of the bleaching compositions was visually checked and evaluated based on the 3-grade criteria shown below.

(Evaluation Criteria on Discoloration of Granulated Product)

X: The bleaching composition has markedly discolored, and particles discolored to black or dark brown are present.

◯: The bleaching composition has slightly discolored, and particles discolored to light brown are present.

◎: The bleaching composition hardly discolored, and particles discolored to black or brown are not present.

The results are shown in Table 6.

"Solubility Test"

A solubility test was performed for the bleaching composition by the following method.

In a 2-L beaker, 1 L of tap water at 20° C. and 5 sheets of polyester jersey (manufactured by Senshoku Shizai Co., Ltd.) having a size of 5×5 cm were placed, and the content was stirred at 120 rpm with a paddle stirrer equipped with four blades each having a size of 4 cm×2 cm (thickness 1 mm) (blade angle 45°) (the height of the lower side of the blades was disposed at 1 cm from the bottom of the beaker). During the stirring, 1 g of the bleaching composition shown in Table 6 was added thereto, and stirring was continued for 10 minutes. Thereafter, suction filtration was performed using a black-colored filter paper, and the solution residues on the filter paper were visually observed and evaluated based on the 2-grade criteria shown below.

(Evaluation Criteria for Solubility of Bleaching Composition)

X: Solution residues of particles are presented (excluding the powdered residue of zeolite or white carbon)

◯: Solution residues of particles are not present (excluding the powdered residue of zeolite or white carbon)

The results are shown in Table 6.

<Summary of Results of Table 4 and Table 6>

From the above results, Examples 1 to 18 all obtained high evaluation results on the bleaching effect, the effect of preventing discoloration of granulated product, and solubility. Since Comparative Examples 1 did not contain a chalete agent, the bleaching effect, the effect of preventing discoloration of granulated product, and solubility were all decreased. Comparative Examples 3 to 5 did not use the binder compound of the invention, and thus the effect of preventing discoloration of granulated product was low. The bleaching effect was low since the chelate agent which did not correspond to the component (b) of the present invention was used in Comparative Example 6.

<Preparation of Bleaching Detergent Composition 2>

The chelate agent described in paragraph [0122] was used as the component (a).

In addition to copper(II) sulfate pentahydrate, cobalt chloride, complexes L1 and L2, the following compounds were used as the component (b).

CuCl$_2$: Copper(II) chloride dihydrate (manufactured by Kanto Chemical Co., Ltd.)

Cu gluconate: Copper(II) gluconate (manufactured by Tokyo Chemical Industries, Ltd.)

Polyethylene glycol #6000M (manufactured by Lion Corp.) and, a sodium salt of an acrylic acid/maleic anhydride copolymer (trade name: AQUALIC LT-400, manufactured by Nippon Shokubai, Co., Ltd., pure fraction 40 mass % aqueous solution) (hereinafter, may be referred to as MA agents) was used as the component (c).

The components (a) to (c), a dissolution promoting agent, and a surface coating agent were used to prepare oxidation catalyst particles by the three methods shown below. The compositions of the respective components are shown in Table 8 to Table 10.

TABLE 8

|  |  | Example |  |  |  |  |  |  |  |
|---|---|---|---|---|---|---|---|---|---|
|  |  | Stirring granulation | | Extrusion granulation | | Pulverization granulation | | | |
|  |  | 1 | 2 | 3 | 4 | 5 | 6 | 7 | 8 |
| Copper compound (b) | CuSO$_4$·5H$_2$O | 2.5% | 2.5% | 2.5% | 2.5% | 2.5% | 2.5% | 2.5% | 2.5% |
| Copper complex | Copper complex L4 | | | | | | | | |
|  | Copper complex L2 | | | | | | | | |
| Chelate agent (a) | Dipicolinic acid | | | | | 47.5% | | | |
|  | IDS | 25% | | 47.5% | | | 47.5% | | |
|  | HIDS | | | | | | | 47.5% | |
|  | MGDA | | 25% | | 47.5% | | | | 47.5% |
| Comparaive chelate agent (Coordination position 6) | EDTA | | | | | | | | |
| Binder compound (c) | PEG6000 | | | 50% | 50% | 50% | 50% | 50% | 50% |
|  | MA agent | 10% | 10% | | | | | | |
| Dissolution promoting agent | Sodium sulfate | 57.5% | 57.5% | | | | | | |
| Surface coating agent | SiO$_2$ | 5% | 5% | | | | | | |
| a/b (mass ratio) | | 7.4 | 9.2 | 14.1 | 17.5 | 28.4 | 14.1 | 13.5 | 17.5 |
| Colon *bacillus* sterilizing power | | ⊚ | ⊚ | ⊚ | ⊚ | ○ | ⊚ | ⊚ | ⊚ |
| Hydrogen peroxide stability | | 4 | 4 | 4 | 4 | 4 | 4 | 4 | 4 |

|  |  | Example | | Comparative Example | | | | | |
|---|---|---|---|---|---|---|---|---|---|
|  |  | Pulverization granulation | | Stirring granulation | | Extrusion granulation | | Pulverization granulation | |
|  |  | 9 | 10 | 1 | 2 | 3 | 4 | 5 | 6 |
| Copper compound (b) | CuSO$_4$·5H$_2$O | | | 2.5% | 2.5% | 2.5% | 2.5% | 2.5% | 2.5% |
| Copper complex | Copper complex L4 | 50% | | | | | | | |
|  | Copper complex L2 | | 50% | | | | | | |
| Chelate agent (a) | Dipicolinic acid | | | | | | | | |
|  | IDS | | | | | | | | |
|  | HIDS | | | | | | | | |
|  | MGDA | | | | | | | | |
| Comparaive chelate agent (Coordination position 6) | EDTA | | | | 25% | | 47.5% | | 47.5% |
| Binder compound (c) | PEG6000 | 50% | 50% | | | 50% | 50% | 50% | 50% |
|  | MA agent | | | 10% | 10% | | | | |
| Dissolution promoting agent | Sodium sulfate | | | 82.5% | 57.5% | 47.5% | | 47.5% | |
| Surface coating agent | SiO$_2$ | | | 5% | 5% | | | | |
| a/b (mass ratio) | | 14.1 | 17.5 | — | 6.6 | — | 12.5 | — | 12.5 |
| Colon *bacillus* sterilizing power | | ⊚ | ⊚ | Δ | X | Δ | X | Δ | X |
| Hydrogen peroxide stability | | 4 | 4 | 1 | 4 | 1 | 4 | 1 | 4 |

TABLE 9

| | | Example Pulverization granulation | | | | | | | | | |
|---|---|---|---|---|---|---|---|---|---|---|---|
| | | 11 | 12 | 13 | 14 | 15 | 16 | 17 | 18 | 19 | 20 |
| Copper compound (b) | CuSO$_4$•5H$_2$O | 0.5% | 0.5% | 0.5% | 0.5% | 0.5% | 0.5% | 0.5% | 0.5% | 0.5% | 0.5% |
| Chelate agent (a) | IDS | 0.5% | | 0.7% | | 1.4% | | 3.4% | | 60.6% | |
| | MGDA | | 0.4% | | 0.6% | | 1.1% | | 2.7% | | 49.5% |
| Binder compound (c) | PEG6000 | 50% | 50% | 50% | 50% | 50% | 50% | 50% | 50% | 39.8% | 50% |
| Dissolution promoting agent | Sodium sulfate | 49% | 49.1% | | | 48.1% | 43.4% | 46.1% | 46.8% | | |
| a/b molar ratio | | 0.74 | 0.74 | 1 | 1.1 | 2 | 2 | 5 | 5 | 90 | 91.2 |
| Colon bacillus sterilizing power | | ○ | ○ | ○ | ○ | ○ | ○ | ◎ | ◎ | ◎ | ◎ |
| Hydrogen peroxide stability | | 3 | 3 | 3.5 to 4 | 3.5 to 4 | 4 | 4 | 5 | 5 | 5 | 5 |

TABLE 10

| | | Example Pulverization granulation | | | Comparative Example Pulverization granulation | | | | | |
|---|---|---|---|---|---|---|---|---|---|---|
| | | 21 | 22 | 23 | 7 | 8 | 9 | 10 | 11 | 12 |
| Copper compound (b) | CuSO$_4$•5H$_2$O | 2.5% | | | | | 2.5% | | | |
| | CuCl$_2$•2H$_2$O | | 1.7% | | | | | | | |
| | Cu gluconate | | | 4.5% | | | | | | |
| Metal compound (other than copper) | CoSO$_4$•7H$_2$O | | | | | 2.8% | | | | |
| Chelate agent (a) | IDS | 47.5% | 47.5% | 47.5% | 47.5% | 47.5% | | 47.5% | | |
| Binder compound (c) | PEG6000 | 50% | 50.8% | 48% | 50.1% | 49.7% | 50% | 50% | 50% | |
| Dissolution promoting agent | Sodium sulfate | | | | | | 47.5% | 2.5% | 50% | |
| a/b (mass ratio) | | 14.1 | 14.1 | 14.1 | 14.1 | 14.1 | — | — | — | — |
| Colon bacillus sterilizing power | | ◎ | ◎ | ◎ | X | X | Δ | X | X | X |
| Hydrogen peroxide stability | | 4 | 4 | 4 | 5 | 3 | 1 | 5 | 4 | 4 |

"Production of Oxidation Catalyst Particles"

(Production of Particles According to Stirring Granulation Method)

750 g of the component (a), 75 g of the component (b), and 1725 g of sodium sulfate (neutral anhydrous sodium sulfate manufactured by Shikoku Chemical Corp.) were charged into a Ledige mixer Model M20 manufactured by Matsubo Corp., 300 g of the component (c) was slowly added dropwise under stirring. 150 g of finely powdered silica (Tokusil manufactured by Tokuyama Corp.) was added while the mixture was further stirred. Thus, the desired oxidation catalyst particles were obtained.

(Production of Particles According to Extrusion Granulation Method)

500 g in total of the components (a) to (c) were charged into a continuous kneader Model KRS-S1 manufactured by Kurimoto, Ltd. at the proportions of Table 8, and the mixture was kneaded at 65° C. Then, the kneaded product was extruded through a multi-hole screen having a hole diameter of 1 mm, and thus a noodle-shaped solid substance was obtained.

This solid substance was pulverized using a New Speed Mill manufactured by Okada Seiko Co., Ltd., and thereby oxidation catalyst particles were obtained.

(Production of Particles According to Pulverization Granulation Method)

500 g in total of the components (a) to (c) were kneaded at 65° C. in the same manner as in the extrusion granulation method at the proportions of Tables 8 to 10, and then the kneaded product was extruded through a multi-hole screen to obtain a solid substance in a bulk state. This bulk-state solid substance was pulverized into lumps each measuring several centimeters on each side, and then the lumps were pulverized in the same manner as in the extrusion granulation method to thereby obtain oxidation catalyst particles.

The obtained oxidation catalyst particles were all sorted with sieves, and the particles having a particle size of 300 to 700 μm were used to perform an evaluation shown below.

Subsequently, according to the composition shown, in Table 11, sodium percarbonate (percarbonate 1 mentioned above), the surfactant-containing particles mentioned above, the enzyme mentioned above, sodium carbonate (manufactured by Asahi Glass Co., Ltd., soda ash), and the bleach activating agent particles mentioned above (OBS) were added to a horizontal cylindrical tumbling mixer (a mixer having two baffles having a height of 45 nun high and its clearance of 20 mm, disposed at a clearance of 20 mm away from the internal wall surface on the internal wall surface of a drum having a cylinder diameter of 585 mm, a cylinder length of 490 mm, and a capacity of 131.7 L) and mixed by tumbling for one minute under the conditions of a packing ratio of 30 volume %, a speed of rotation of 22 rpm and 25° C., to obtain a base composition.

10 g of the oxidation catalyst particles were incorporated into 1000 g of the base composition and uniformly mixed, and thereby a bleaching detergent composition 2 was obtained.

TABLE 11

| Base composition | Amount of incorporation |
| --- | --- |
| Sodium percarbonate | 5 |
| Surfactant-containing particles | 77.5 |
| Sodium carbonate | 15 |
| Enzyme | 2 |
| Bleach activating agent particles | 0.5 |

"Evaluation of Sterilizing Power"

The sterilizing power against colon bacillus was evaluated by the same method as that described in paragraph [0142]. The results are shown in Tables 8 to 10.

"Hydrogen Peroxide Stability Evaluation"

A hydrogen peroxide stability test was carried out by the same method as that described in paragraph [0144]. The results are shown in Tables 8 to 10.

<Summary of Results of Tables 8 to 10>

From the results shown above, Examples 1 to 23 all showed sufficient values of sterilizing power and hydrogen peroxide stability. Furthermore, as shown in Table 9, it was found that when a comparison was made between Examples 11 to 20 in which the mole ratio of the component (a) and the component (b) (a/b) were changed in the range of 0.74 to 91.2, as the value of a/b increased, the sterilizing power and the hydrogen peroxide stability were all increased.

In Comparative Examples 1, 3, 5 and 9, the component (a) was not included, and thus both sterilizing power and hydrogen peroxide stability were low. In Comparative Examples 2, 4 and 6, EDTA of coordination position 6 was used as a chelate agent instead of the component (a), the hydrogen peroxide stability was high, but the sterilizing power was low.

In Comparative Example 8, a Co compound was used instead of the component (b), and thus the hydrogen peroxide stability was sufficient, but the sterilizing power was low.

In Comparative Example 11, both of the component (a) and the component (b) were not included, and thus sterilizing power was low even though hydrogen peroxide stability was high. Furthermore, Comparative Example 12 was a base composition which did not contain all of the components (a) to (c), and the hydrogen peroxide stability was sufficient, but the sterilizing power was absent.

<Preparation of Bleaching Agent Composition>

As the component (a), the following compounds in addition to the chelate agent described in [0122] were used.

Dipicolinic acid: 2,6-pyridinedicarboxylic acid (manufactured by MERCK KGaA)

NTA3Na: Nitrilotriacetic acid trisodium salt (manufactured by Kanto Chemical Co., Inc.)

STPP: Sodium Tripolyphosphate (manufactured by Kanto Chemical Co., Inc.) As the component (b), in addition to the above copper (II) sulfate pentahydrate, the complex L1 and complex L2, $MnSO_4$: Manganese (II) sulfate pentahydrate (manufactured by Kanto Chemical Co., Inc.) and the following complex was used.

As the component (c), the above PEG6000, PEG4000, and MA agent were used.

"Production of Oxidation Catalyst Particles"

Oxidation catalyst particles were produced by the three methods described in paragraph [0157]. The compositions of the respective components are shown in Tables 12 to 14.

TABLE 12

| | | Example | | | | | | | | | | | | | | |
| --- | --- | --- | --- | --- | --- | --- | --- | --- | --- | --- | --- | --- | --- | --- | --- | --- |
| | | Stirring granulation | | | | Extrusion granulation | | | | Pulverization granulation | | | | | | |
| | | 1 | 2 | 3 | 4 | 5 | 6 | 7 | 8 | 9 | 10 | 11 | 12 | 13 | 14 | 15 |
| Transition metal compound (b) | $CuSO_4 \cdot 5H_2O$ | 2.5 | 2.5 | | | 2.5 | 2.5 | | | 2.5 | 2.5 | 2.5 | 2.5 | | | |
| | $MnSO_4 \cdot 5H_2O$ | | | 2.5 | 2.5 | | | 2.5 | 2.5 | | | | | 2.5 | 2.5 | 2.5 |
| Transition metal complex | Copper complex L4 | | | | | | | | | | | | | | | |
| | Manganese complex M1 | | | | | | | | | | | | | | | |
| | Copper complex L2 | | | | | | | | | | | | | | | |
| | Manganese complex M2 | | | | | | | | | | | | | | | |
| Chelate agent (a) | Dipicolinic acid | | | | | | | | | 47.5 | | | 47.5 | | | |
| | IDS | 25 | | 25 | | 47.5 | | 47.5 | | | 47.5 | | | 47.5 | | |
| | HIDS | | | | | | | | | | | 47.5 | | | | 47.5 |
| | MGDA | | 25 | | 25 | | 47.5 | | 47.5 | | | | 47.5 | | | |
| Comparaive chelate agent (Coordination position 6) | EDTA | | | | | | | | | | | | | | | |
| Binder compound (c) | PEG6000 | | | | | 50 | 50 | 50 | 50 | 50 | 50 | 50 | 50 | 50 | 50 | 50 |
| | MA agent | 10 | 10 | 10 | 10 | | | | | | | | | | | |
| Dissolution promoting agent | Sodium sulfate | 57.5 | 57.5 | 57.5 | 57.5 | | | | | | | | | | | |
| Surface coating agent | $SiO_2$ | 5 | 5 | 5 | 5 | | | | | | | | | | | |
| a/b (mass ratio) | | 7.4 | 9.2 | 7.2 | 8.9 | 14.1 | 17.5 | 13.6 | 16.9 | 28.4 | 14.1 | 13.5 | 17.5 | 27.4 | 13.6 | 13.0 |

TABLE 12-continued

| | | | | | | | | | | | | | | | | |
|---|---|---|---|---|---|---|---|---|---|---|---|---|---|---|---|---|
| Curry bleaching power | ◎ | ◎ | ◎ | ◎ | ◎ | ◎ | ◎ | ◎ | ◎ | ◎ | ◎ | ◎ | ◎ | ◎ | ◎ | |
| Hydrogen peroxide stability | 4 | 4 | 5 | 5 | 4 | 4 | 5 | 5 | 4 | 4 | 4 | 4 | 5 | 5 | 5 | |

| | | Example Pulverization granulation | | | | | | | Comparative Example Pulverization granulation | | | | | |
|---|---|---|---|---|---|---|---|---|---|---|---|---|---|---|
| | | 16 | 17 | 18 | 19 | 20 | 21 | 22 | 1 | 2 | 3 | 4 | 5 | 6 |
| Transition metal compound (b) | CuSO$_4$•5H$_2$O | | 1.25 | 1.25 | | | | | 2.5 | | 2.5 | | | |
| | MnSO$_4$•5H$_2$O | 2.5 | 1.25 | 1.25 | | | | | | 2.5 | | 2.5 | | |
| Transition metal complex | Copper complex L4 | | | | | | | | | | | | | |
| | Manganese complex M1 | | | | 50 | 50 | | | | | | | | |
| | Copper complex L2 | | | | | | 50 | | | | | | | |
| | Manganese complex M2 | | | | | | | 50 | | | | | | |
| Chelate agent (a) | Dipicolinic acid | | | | | | | | | | | | | |
| | IDS | | 47.5 | | | | | | | | | | | 47.5 |
| | HIDS | | | | | | | | | | | | | |
| | MGDA | 47.5 | | 47.5 | | | | | | | | | | |
| Comparaive chelate agent (Coordination position 6) | EDTA | | | | | | | | 47.5 | 47.5 | | | | |
| Binder compound (c) | PEG6000 | 50 | 50 | 50 | 50 | 50 | 50 | 50 | 50 | 50 | 50 | 50 | 50 | |
| | MA agent | | | | | | | | | | | | | |
| Dissolution promoting agent | Sodium sulfate | | | | | | | | | | | | | |
| Surface coating agent | SiO$_2$ | | | | | | | | | | | | | |
| a/b (mass ratio) | | 16.9 | 13.9 | 17.2 | 14.1 | 13.6 | 17.5 | 16.9 | 12.5 | 12.0 | | | | |
| Curry bleaching power | | ◎ | ◎ | ◎ | ◎ | ◎ | ◎ | ◎ | X | X | Δ | Δ | X | X |
| Hydrogen peroxide stability | | 5 | 4 | 4 | 4 | 5 | 4 | 5 | 4 | 5 | 1 | 1 | 5 | 4 |

TABLE 13

| | | Example Pulverization granulation | | | | | | | | | |
|---|---|---|---|---|---|---|---|---|---|---|---|
| | | 23 | 24 | 25 | 26 | 27 | 28 | 29 | 30 | 31 | 32 |
| Transition metal complex (b) | MnSO$_4$•5H$_2$O | 1 | 1 | 1 | 1 | 1 | 1 | 1 | 1 | 1 | 1 |
| Chelate agent (a) | IDS | 1.1 | | 1.4 | | 2.8 | | 7.0 | | 55.8 | |
| | MGDA | | 0.9 | | 1.2 | | 2.2 | | 5.6 | | 45 |
| Binder compound (c) | PEG6000 | 50 | 50 | 50 | 50 | 50 | 50 | 50 | 50 | 43.2 | 50 |
| Dissolution promoting agent | Sodium sulfate | 47.9 | 48.1 | | | 46.2 | 46.8 | 42 | 43.4 | | 4 |
| a/b (mass ratio) | | 0.8 | 0.8 | 1.0 | 1.1 | 2 | 2 | 5 | 5 | 40 | 40 |
| Curry bleaching power | | ○ | ○ | ○ | ○ | ○ | ○ | ◎ | ◎ | ◎ | ◎ |
| Hydrogen peroxide stability | | 3 | 3 | 4 | 4 | 5 | 5 | 5 | 5 | 5 | 5 |

TABLE 14

| | | Example Pulverization granulation | | | | | | | Comparative Example | | | |
|---|---|---|---|---|---|---|---|---|---|---|---|---|
| | | 33 | 34 | 35 | 36 | 37 | 38 | 39 | 7 | 8 | 9 | 10 |
| Transition metal complex (b) | MnSO$_4$•5H$_2$O | 2.5 | 2.5 | 2.5 | 2.5 | 2.5 | 2.5 | 2.5 | 2.5 | 2.5 | | |
| Chelate agent (a) | IDS | 47.5 | | | | | | | | | 47.5 | |
| | Dipicolinic acid | | 47.5 | | | | | | | | | |
| | MGDA | | | 47.5 | | | | | | | | |
| | NTA3Na | | | | 47.5 | | | | | | | |
| | GLDA4Na | | | | | 47.5 | | | | | | |
| | Trisodium citrate | | | | | | 47.5 | | | | | |
| | STPP | | | | | | | 47.5 | | | | |
| Comparaive chelate agent (Coordination position 6) | EDTA | | | | | | | | 47.5 | | | |

TABLE 14-continued

|  |  | Example | | | | | | | Comparative Example | | | |
|---|---|---|---|---|---|---|---|---|---|---|---|---|
|  |  | Pulverization granulation | | | | | | | | | | |
|  |  | 33 | 34 | 35 | 36 | 37 | 38 | 39 | 7 | 8 | 9 | 10 |
| Binder compound (c) | PEG4000 | 50 | 50 | 50 | 50 | 50 | 50 | 50 | 50 | 50 | 50 | 50 |
| Dissolution promoting agent | Sodium sulfate |  |  |  |  |  |  |  |  | 47.5 | 2.5 | 50 |
| a/b (mass ratio) |  | 13.6 | 27.4 | 16.9 | 17.8 | 13.5 | 17.8 | 12.5 | 12 |  |  |  |
| Black tea bleaching power |  | ⊚ | ⊚ | ⊚ | ○ | ○ | ○ | ○ | X | Δ | X | X |
| Hydrogen peroxide stability |  | 5 | 5 | 5 | 5 | 4 | 4 | 4 | 5 | 1 | 5 | 4 |

(Preparation of Bleaching Agent Composition 1)

12 g of the bleaching catalyst particles were incorporated into 500 g of the composition shown in Table 15, and the mixture was uniformly mixed. Thus, a bleaching agent composition 1 (Examples 1 to 32, Comparative Example 1 to 6) was obtained.

TABLE 15

| Composition | Proportion incorporated |
|---|---|
| Na percarbonate | 50% |
| Enzyme | 1% |
| Polyoxyethylene alkyl ether (8E.O.) | 0.50% |
| Soda ash (light ash) | 2.50% |
| Soda ash (particulate ash) | 46% |

(Preparation of Bleaching Agent Composition 2)

7 g of the bleaching catalyst particles were incorporated into 700 g of the composition shown in Table 16, and the mixture was uniformly mixed. Thus, a bleaching agent composition 2 (Examples 33 to 39, Comparative Example 7 to 10) was obtained.

TABLE 16

| Composition | Proportion incorporated |
|---|---|
| Polyoxyethylene polyoxypropylene alkyl ether | 2% |
| Silicone compound | 0.50% |
| Sodium carbonate | 20% |
| Enzyme | 1.50% |
| Anhydrous silicic acid | 1.50% |
| Na percarbonate | 20% |
| Tetraacetylethylene diamine | 1% |
| Anhydrous Na sulfate | 53.50% |

[Test on Bleaching of Curry-stained Cloth]

(Preparation of Curry-stained Cloth)

Five packs of retort curry (Bon Curry Gold Medium-Spicy (manufactured by Otsuka Foods Co. Ltd.), quantity of contents: 200 g/pack) which had been warmed in hot water for 5 minutes were filtered using a gauze to remove solid substances, and 5 sheets of plain cotton cloth (#100) having a size of 25×30 cm were immersed in the liquid so that the liquid was uniformly adhered to the cloth while warming for 30 minutes. The cloth pieces were taken out and rinsed with tap water until the rinsing liquid was not colored, and the cloth pieces were dehydrated and dried naturally. The cloth pieces were cut to specimens having a size of 5×5 cm, and were supplied to the experiment.

(Curry Stain Bleaching Test)

200 mL of a test solution of the bleaching agent composition 1 at a concentration of 0.5 mass % (prepared in 3° DH hard water using deionized water at 25° C. and calcium chloride) was prepared, and this solution was applied to 5 sheets of the stained cloth obtained as described above for 1 hour. Thereafter, the cloth pieces were rinsed with tap water for 2 minutes and dehydrated for 1 minute, and were air-dried for 12 hours at 25° C.

The reflectance of the original cloth and the stained cloth before and after washing was measured using NDR-101DP manufactured by Nippon Denshoku Industries Co., Ltd. and a 460-nm filter, and the washing bleaching power was determined by the above expression (2). Thereby, an evaluation of the bleaching power was carried out. The bleaching power was obtained by determining the average value of the bleaching power on 5 sheets of stained cloth, and was evaluated based on the 4-grade evaluation criteria shown below.

(Evaluation Criteria on Curry Bleaching Power)

Reference composition (25° C., 3° DH, applied for 30 minutes)

Sodium percarbonate 50%, sodium carbonate 50% (bleaching ratio 45%)

X: Bleaching power is lower compared to the reference composition.

Δ: Bleaching power is equal or greater compared to the reference composition, equal to or more than 0% and less than +10%

○: Bleaching power is higher compared to the reference composition, and equal to or greater than +10% and less than 15%

⊚: Bleaching power is markedly higher compared to the reference composition, and equal to or greater than +15%.

The results are shown in Table 12 and Table 13.

"Test on Bleaching of Black Tea-stained Cloth"

(Preparation of Black Tea-stained Cloth)

Black tea-stained cloth: 84 g of Nittoh black tea (yellow package) was boiled in 4 L of tap water for 15 minutes, and then the resulting liquid was filtered through a desized bleached cotton cloth. In this liquid, 120 g of plain cotton cloth (#100) having a size of 35×35 cm was immersed and boiled for 15 minutes. The cloth was taken of as such from the heat and was allowed to stand for about 2 hours. The cloth was naturally dried and washed with tap water until the washing liquid was not colored. The cloth was dehydrated, pressed and cut to specimens having a size of 5×5 cm to be supplied to the experiment.

(Black Tea Stain Bleaching Test)

Five sheets of the black tea-stained cloth were mounted in an automatic dish washer and dryer "Model NP-40 SX2, manufactured by Matsushita Electric Industrial Co., Ltd.," and 6 g of the prepared bleaching agent composition 2 was used to perform a standard course washing.

The finished state was subjected to a sensory evaluation based on the respective evaluation criteria. The bleaching power was evaluated in the same manner as in the case of the curry stain.

(Black Tea Stain Bleaching Test)

In the same manner as in the curry-stained cloth bleaching test, 200 mL of a test solution of the bleaching agent composition 2 at a concentration of 0.5 mass % (prepared in 3° DH hard water using deionized water at 25° C. and calcium chloride) was prepared, and this solution was applied to 5 sheets of the stained cloth obtained as described above for 1 hour. Thereafter, the cloth pieces were rinsed with tap water for 2 minutes and dehydrated for 1 minute, and were air-dried for 12 hours at 25° C.

The reflectance of the original cloth and the stained cloth before and after washing was measured using NDR-101DP manufactured by Nippon Denshoku Industries Co., Ltd. and a 460-nm filter, and the washing bleaching power was determined by the above expression (1). Thereby, an evaluation of the bleaching power was carried out. The bleaching power was obtained by determining the average value of the bleaching power on 5 sheets of stained cloth, and was evaluated based on the 4-grade evaluation criteria shown below.

(Evaluation Criteria on Black Tea Bleaching Power)

Reference composition (25° C., 3° DH, applied for 30 minutes)

Sodium percarbonate 50%, sodium carbonate 50% (bleaching ratio 45%)

X: Bleaching power is lower compared to the reference composition.

Δ: Bleaching power is equal or greater compared to the reference composition, equal to or more than 0% and less than +10%

◯: Bleaching power is higher compared to the reference composition, and equal to or greater than +10% and less than 15%

◉: Bleaching power is markedly higher compared to the reference composition, and equal to or greater than +15%, The results are shown in Table 14.

"Hydrogen Peroxide Stability Evaluation 2"

For the bleaching agent composition 1 or the bleaching agent composition 2, a hydrogen peroxide stability test was performed by the following method. In a vessel (refill pouch three-layered structure, polyethylene/polypropylene/nylon=130 μm/25 μm/15 μm from the outside, with a pinhole having a diameter of 0.3 mm present), 400 g of the bleaching agent composition was placed and stored for 2 weeks under recycle conditions at 45° C. and 25° C. (45° C.: humidity of 85% 16 h, 25° C.: humidity 65% 8 h), and then an evaluation of the stability of hydrogen peroxide (sodium percarbonate) was carried out by an iodometry method.

(Evaluation Criteria on Hydrogen Peroxide Stability)

From the value of the residual ratio of sodium percarbonate, hydrogen peroxide stability was evaluated based on the following 5 grades.

5 points: higher than 90%
4 points: higher than 80% and equal to or less than 90%
3 points: higher than 70% and equal to or less than 80%
2 points: higher than 60% and equal to or less than 70%
1 point: higher than 40% and equal to or less than 60%
0 point: 0% to equal to or less than 40%

The results are presented in Table 12 to Table 14.

<Summary of Results of Table 12 to Table 14>

From the above results, Examples 1 to 39, all exhibited sufficient values in the bleaching power and the hydrogen peroxide stability. Furthermore, as shown in Table 13, it was found that when a comparison is made between Examples 23 to 32 in which the molar ratio of the component (a) and the component (b) (a/b) was changed in the range of 0.8 to 40, as the value of a/b increases, both the sterilizing power and the hydrogen peroxide stability were increased.

In Comparative Examples 1, 2 and 7, EDTA of coordination position 6 was used as a chelate agent instead of the component (a), the hydrogen peroxide stability was high, but the sterilizing power was low. In Comparative Example 3, 4 and 8, the component (a) was not included, and thus both of sterilizing power and hydrogen peroxide stability were low. In Comparative Example 5 and 9, the component (a) was not included, and thus the hydrogen peroxide stability was high, but the sterilizing power was low. In Comparative Example 10, both of the component (a) and the component (b) were not included, and thus the hydrogen peroxide stability was high, but the sterilizing power was low. Furthermore, in Comparative Example 6 was the base compound which did not include any of the component (a) to (e), and hydrogen peroxide was sufficient but the bleaching power was absent.

INDUSTRIAL APPLICABILITY

According to the invention, the oxidation effect of the hydrogen peroxide-based compound is promoted even in a trace amount, and the invention can be utilized as an oxidation catalyst having excellent effects of suppressing the decomposition of hydrogen peroxide-based compounds and suppressing coloration of the catalyst itself; and a bleaching composition containing the oxidation catalyst.

The invention claimed is:

1. An oxidation catalyst for bleaching, comprising:
   a component (a) which is 2,2'-iminodisuccinic acid tetrasodium salt or methylglycinediacetic acid trisodium salt, and
   a component (b) which is copper sulfate,
   wherein component (a) is 2,2'-iminodisuccinic acid tetrasodium salt, or methylglycine diacetic acid trisodium salt,
   wherein the copper compound comprises copper sulfate,
   wherein the oxidation catalyst is capable of releasing metal ions in an aqueous solution, and
   wherein the molar ratio of component (a) to component (b) is from 5:1 to 91.2:1.

2. Oxidation catalyst particles comprising:
   the oxidation catalyst for bleaching according to claim 1, and a binder compound (c).

3. A bleaching composition comprising: a granule or molded product comprising:
   a component (a) which is 2,2'-iminodisuccinic acid tetrasodium salt or methylglycinediacetic acid trisodium salt,
   a component (b) which is copper sulfate, a binder compound (c), and
   a hydrogen peroxide-based compound (d) which dissolves in water and generates hydrogen peroxide,
   wherein the granulated product or a molded product contains at least the components (b) and (c) granulated or molded together,
   and wherein the molar ratio of component (a) to component (b) is from 5:1 to 91.2:1.

4. The bleaching composition according claim 3, wherein the component (c) is a binder compound which is at least one of (c-1) a polyethylene glycol having an average molecular weight of 2500 to 10000, and a block polymer of ethylene oxide and propylene oxide, and (c-2) a nonionic surfactant having an HLB value of 16 or greater as determined by Griffin's method.

5. The bleaching composition according to claim 4, wherein the component (c-1) is a polyethylene glycol having an average molecular weight of 7300 to 9300 and a block polymer of ethylene oxide and propylene oxide.

6. The bleaching composition according to claim 4, wherein the component (c-2) is a nonionic surfactant having an ethylene oxide addition mole number of 40 to 80 and having an HLB value of 16 or greater as determined by Griffin's method.

7. The bleaching composition according to claim 3, further comprising a bleach activating agent (e) represented by the following formula (IV):

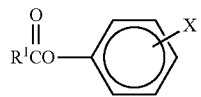
(IV)

wherein $R^1$ represents a linear alkyl group having 7 to 18 carbon atoms, which may contain a saturated or an unsaturated bond; and X represents —H, —COOM or —SO$_3$M, wherein M is a cation.

8. The bleaching composition according to claim 3, further comprising a surfactant (f).

9. The oxidation catalyst for bleaching according to claim 1, wherein component (a) forms a complex in a solution with the copper of component (b).

10. The bleaching composition according to claim 3, wherein component (a) forms a complex in a solution with the copper of component (b).

11. A method for oxidation promotion, sterilization or disinfection, comprising:

adjusting an aqueous solution containing the oxidation catalyst according to claim 1, wherein the content of the oxidation catalyst is 0.02 to 2.0 mass % of the aqueous solution, and bleaching articles to be washed, by the aqueous solution.

12. A method for oxidation promotion, sterilization or disinfection, comprising:

adjusting an aqueous solution containing the bleaching composition according to claim 3, wherein the content of the bleaching composition is 0.02 to 2.0 mass % of the aqueous solution, and bleaching articles to be washed, by the aqueous solution.

13. A method for oxidation promotion, sterilization or disinfection, comprising:

adjusting an aqueous solution containing the oxidation catalyst according to claim 1, wherein the content of the oxidation catalyst is 0.02 to 0.5 mass % of the aqueous solution, and bleaching articles to be washed, by the aqueous solution.

14. A method for oxidation promotion, sterilization or disinfection, comprising:

adjusting an aqueous solution containing the bleaching composition according to claim 3, wherein the content of the bleaching composition is 0.02 to 0.5 mass % of the aqueous solution, and bleaching articles to be washed, by the aqueous solution.

* * * * *